(12) United States Patent
Na et al.

(10) Patent No.: US 11,937,206 B2
(45) Date of Patent: Mar. 19, 2024

(54) METHOD AND DEVICE FOR SUBSCRIBING AND NOTIFYING

(71) Applicants: Hyundai Motor Company, Seoul (KR); Kia Corporation, Seoul (KR)

(72) Inventors: Young Jin Na, Gyeonggi-do (KR); Min Byeong Lee, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 358 days.

(21) Appl. No.: 17/426,280

(22) PCT Filed: Feb. 11, 2020

(86) PCT No.: PCT/KR2020/001882
§ 371 (c)(1),
(2) Date: Jul. 28, 2021

(87) PCT Pub. No.: WO2020/166927
PCT Pub. Date: Aug. 20, 2020

(65) Prior Publication Data
US 2021/0400629 A1 Dec. 23, 2021

(30) Foreign Application Priority Data
Feb. 11, 2019 (KR) .................. 10-2019-0015652

(51) Int. Cl.
*H04W 4/70* (2018.01)
*H04W 8/18* (2009.01)
(Continued)

(52) U.S. Cl.
CPC .......... *H04W 68/005* (2013.01); *H04W 4/70* (2018.02); *H04W 8/18* (2013.01); *H04W 72/56* (2023.01); *H04W 88/18* (2013.01)

(58) Field of Classification Search
CPC .................................................. H04W 68/005
(Continued)

(56) References Cited

U.S. PATENT DOCUMENTS 6,502,157 B1 * 12/2002 Batchelor ........... G06F 13/4059
710/305
9,141,628 B1 * 9/2015 Zimmermann ......... H04L 67/10
(Continued)

FOREIGN PATENT DOCUMENTS

KR  10-2016-0039612 A   4/2016
KR  10-2016-0048169 A   5/2016
(Continued)

OTHER PUBLICATIONS

"Service Layer Core Protocol Specification", oneM2M-TS-0004-V1.13.0, oneM2M Partners Type 1, dated Mar. 22, 2018, 258 pages.

*Primary Examiner* — Qutbuddin Ghulamali
(74) *Attorney, Agent, or Firm* — Fox Rothschild LLP

(57) ABSTRACT

A method for transmitting, by a host, a notification to a subscriber may include: setting a plurality of subscription conditions based on a cross resource; detecting each event that satisfies each of the plurality of subscription conditions; and, when all the plurality of subscription conditions are satisfied, transmitting a notification for the cross resource to the subscriber. The plurality of subscription conditions may have a priority order.

19 Claims, 14 Drawing Sheets

(51) Int. Cl.
  *H04W 68/00*  (2009.01)
  *H04W 72/56*  (2023.01)
  *H04W 88/18*  (2009.01)

(58) Field of Classification Search
  USPC .......................................................... 455/458
  See application file for complete search history.

(56) References Cited

U.S. PATENT DOCUMENTS

| | | | | |
|---|---|---|---|---|
| 2013/0188483 | A1* | 7/2013 | Teepell ............... | H04L 43/0876 |
| | | | | 370/235 |
| 2015/0067154 | A1* | 3/2015 | Ly ...................... | H04L 43/0876 |
| | | | | 709/224 |
| 2016/0088420 | A1* | 3/2016 | Kim ..................... | H04W 28/16 |
| | | | | 370/328 |

FOREIGN PATENT DOCUMENTS

| | | | |
|---|---|---|---|
| KR | 10-2016-0061965 | A | 6/2016 |
| KR | 10-1852727 | B1 | 4/2018 |
| KR | 10-2018-0082555 | A | 7/2018 |
| KR | 10-2019-0002340 | A | 1/2019 |
| KR | 10-2019-0004233 | A | 1/2019 |
| WO | 2015/031750 | A1 | 3/2015 |
| WO | 2016/039549 | A1 | 3/2016 |
| WO | 2017/087367 | A1 | 5/2017 |

* cited by examiner

METHOD AND DEVICE FOR SUBSCRIBING AND NOTIFYING

CROSS-REFERENCE TO RELATED APPLICATIONS

This application is a National Phase application filed under 35 USC 371 of PCT International Application No. PCT/KR2020/001882 with an International Filing Date of Feb. 11, 2020, which claims the benefit of Korean Application 10-2019-0015652 filed on Feb. 11, 2019. The entire contents of these applications are incorporated herein by reference in their entirety.

BACKGROUND

(a) Technical Field

The present disclosure relates to a method and apparatus for performing subscription and notification in a system, more particularly, to the method and apparatus for performing subscription and notification in a machine-to-machine (M2M) system.

(b) Description of the Related Art

Recently, the introduction of machine-to-machine (M2M) systems has occurred. An M2M communication generally refers to a communication carried out between machines without human intervention. M2M may refer to machine type communication (MTC), Internet of Things (IoT), or device-to-device (D2D). However, in the following description, the term "M2M" is used for convenience of explanation, and the present disclosure is not limited thereto. A terminal used for M2M communication may be an M2M terminal (M2M device). An M2M terminal may generally be a device having low mobility, while transmitting a small amount of data. Herein, the M2M terminal may be used in connection with an M2M server that centrally stores and manages inter-machine communication information.

In addition, an M2M terminal may be applied to various systems for object tracking, automobile linkage, power metering, and the like.

Meanwhile, with respect to an M2M terminal, various standardization organizations provide methods for providing services.

SUMMARY

The present disclosure has an object to provide a method for performing subscription and notification in a system.

The present disclosure has an object to provide a method for performing notification based on cross subscription in a system.

The present disclosure has an object to provide a method for setting a priority order for a plurality of subscriptions based on cross subscription in a system.

The present disclosure has an object to provide a method for setting an expiration condition of cross subscription in a system.

According to an embodiment of the present disclosure, a method for transmitting, by a host, a notification to a subscriber based on a cross resource may be provided. Herein, the method for transmitting a notification may include: setting a plurality of subscription conditions based on a cross resource; detecting each event satisfying each of the plurality of subscription conditions; and, when all the plurality of subscription conditions are satisfied, transmitting a notification for a cross resource to the subscriber. Herein, the plurality of subscription conditions may have a priority order.

Also, according to an embodiment of the present disclosure, a host may be provided which transmits a notification to a subscriber based on a cross resource. Herein, the host may include a transceiver configured to transmit and receive a signal and a processor configured to control the transceiver. Herein, the processor sets a plurality of subscription conditions based on a cross resource, detects each event satisfying each of the plurality of subscription conditions, and, when all the plurality of subscription conditions are satisfied, transmits a notification for a cross resource to a subscriber. The plurality of subscription conditions may have a priority order.

Also, according to an embodiment of the present disclosure, a method for receiving, by a subscriber, a notification from a host based on a cross resource may be provided. Herein, the method for receiving a notification may include: when a plurality of subscription conditions are all satisfied, receiving a notification for a cross resource from a host; and, based on the received notification, performing an operation. Herein, the host sets the plurality of subscription conditions based on the cross resource, and when detecting each event satisfying each of the plurality of subscription conditions, the host transmits a notification to the subscriber. The plurality of subscription conditions may have a priority order.

Also, according to an embodiment of the present disclosure, a subscriber may be provided which receives a notification to a host based on a cross resource. Herein, the subscriber may include a transceiver configured to transmit and receive a signal and a processor configured to control the transceiver. Herein, when a plurality of subscription conditions are all satisfied, the processor may receive a notification for a cross resource from the host and may perform an operation based on the received notification. Herein, the host sets the plurality of subscription conditions based on a cross resource, and when detecting each event satisfying each of the plurality of subscription conditions, the host transmits a notification to the subscriber. The plurality of subscription conditions may have a priority order.

In addition, the description below may be commonly applied to a host transmitting a notification and a subscriber receiving the notification.

According to an embodiment of the prevent disclosure, only when each event satisfying each of a plurality of subscription conditions is detected in a time window, it is possible to transmit a notification for a cross resource to a subscriber.

Herein, according to an embodiment of the present disclosure, a time window may be started when an event for any one subscription condition among a plurality of subscription conditions is detected.

Herein, according to an embodiment of the present disclosure, when a priority order is set for a plurality of subscription conditions, a time window may be started only when an event for a subscription condition with highest priority among the plurality of subscription conditions is detected.

Herein, according to an embodiment of the present disclosure, when an event for a subscription condition with highest priority is detected and thus a time window is started, if a plurality of subscription conditions are satisfied within a time interval corresponding to the time window, a notification for a cross resource may be transmitted to a subscriber.

Also, according to an embodiment of the present disclosure, a host may request a single resource for each of a plurality of subscription conditions to each M2M entity, and each M2M entity may transmit each notification to the host based on the single resource when an event is triggered based on each subscription condition.

Herein, according to an embodiment of the present disclosure, when a host receives each notification from each M2M entity within a time window, the host may transmit a notification for a cross resource to a subscriber.

Herein, according to an embodiment of the present disclosure, when a plurality of subscription conditions are set based on a cross resource, an expiration counter for the cross resource may be set.

Herein, according to an embodiment of the present disclosure, when there is an existing subscription associated with any one or more among a plurality of subscription conditions before the plurality of subscription conditions are set, an expiration counter for the existing subscription may be updated based on an expiration counter for a cross resource.

Also, according to an embodiment of the present disclosure, an expiration counter for an existing subscription may be rewritten as an expiration counter for a cross subscription.

Herein, according to an embodiment of the present disclosure, only when an expiration counter for an existing subscription is smaller than an expiration counter of a cross subscription, the expiration counter for the existing subscription may be rewritten as the expiration counter of the cross subscription.

Also, according to an embodiment of the present disclosure, when an expiration counter for an existing subscription is updated based on an expiration counter for a cross resource, a current notification counter for the existing subscription may be reset.

Herein, according to an embodiment of the present disclosure, only when the number of remaining notifications is smaller than an expiration counter of a cross resource based on a current notification counter for an existing subscription, the current notification counter for the existing subscription may be reset.

According to the present disclosure, subscription and notification may be performed in a system.

According to the present disclosure, notification may be performed based on a cross subscription in a system.

According to the present disclosure, a priority order for a plurality of subscriptions may be set based on a cross subscription in a system.

According to the present disclosure, an expiration condition of a cross subscription in a system may be set.

Effects obtained in the present disclosure are not limited to the above-mentioned effects, and other effects not mentioned above may be clearly understood by those skilled in the art from the following description.

DETAILED DESCRIPTION

Figure 1:
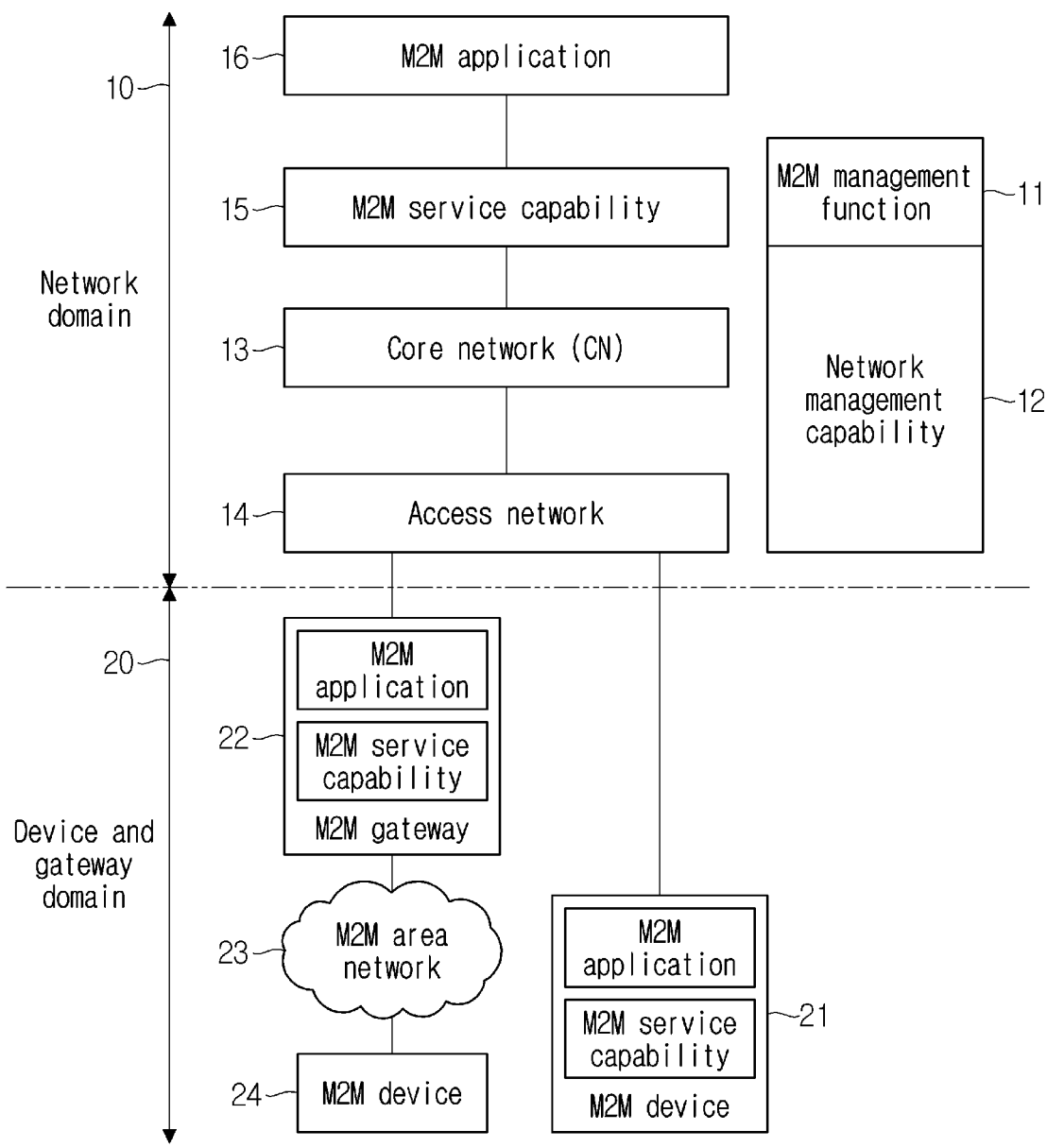
FIG. 1 illustrates an M2M system according to an embodiment.

Hereinafter, embodiments of the present disclosure will be described in detail with reference to the accompanying drawings, which will be easily implemented by those skilled in the art. However, the present disclosure may be embodied in many different forms and is not limited to the exemplary embodiments described herein.

In the present disclosure, the terms first, second, etc. are used only for the purpose of distinguishing one component from another, and do not limit the order or importance of components, etc. unless specifically stated otherwise. Thus, within the scope of the present disclosure, a first component in one embodiment may be referred to as a second component in another embodiment, and similarly a second component in one embodiment may be referred to as a first component in another embodiment.

In the present disclosure, when a component is referred to as being "linked", "coupled", or "connected" to another component, it is understood that not only a direct connection relationship but also an indirect connection relationship through an intermediate component may also be included. Also, when a component is referred to as "comprising" or "having" another component, it may mean further inclusion of another component not the exclusion thereof, unless explicitly described to the contrary.

In the present disclosure, components that are distinguished from each other are intended to clearly illustrate each feature. However, it does not necessarily mean that the components are separate. That is, a plurality of components may be integrated into one hardware or software unit, or a single component may be distributed into a plurality of hardware or software units. Thus, unless otherwise noted, such integrated or distributed embodiments are also included within the scope of the present disclosure.

In the present disclosure, components described in the various embodiments are not necessarily essential components, and some may be optional components. Accordingly, embodiments consisting of a subset of the components described in one embodiment are also included within the scope of the present disclosure. Also, an embodiment that includes other components in addition to the components described in the various embodiments is also included in the scope of the present disclosure.

In the following description of the embodiments of the present disclosure, a detailed description of known configurations or functions incorporated herein will be omitted when it may make the subject matter of the present disclosure rather unclear. In addition, parts not related to the description of the present disclosure in the drawings are omitted, and like parts are denoted by similar reference numerals.

In addition, as an example, a system in the present disclosure may be a system utilizing IoT (Internet of Things), a system utilizing M2M (Machine To Machine), etc. In addition, any other system to which an operation based on the present disclosure is applied may be a system referred to in the present disclosure, and is not limited to the above-described embodiment.

In addition, the present specification describes a network based on M2M communication, and work done in an M2M communication network may be performed in a process of network control and data transmission in a system managing the communication network.

In addition, in the present specification, an M2M terminal may be a terminal performing M2M communication. However, in consideration of backward compatibility, it may be a terminal operating in a wireless communication system. In other words, an M2M terminal may mean a terminal operating based on M2M communication network but is not limited thereto. An M2M terminal may operate based on another wireless communication network and is not limited to the embodiment described above.

As an example, a terminal used for M2M communication may be referred to as an M2M device. Herein, the M2M device generally has such features as low mobility, time tolerance or delay tolerance, and small data transmission and may be used in connection with an M2M server configured to centrally store and manage M2M communication information. In addition, when an M2M device is connected according to different communication modes, the M2M device is connected with an M2M server through an M2M gateway in an interval where communication modes are changed, and thus a whole M2M system may be configured. As an example, based on the system, such services as a traffic service (e.g., intelligent transport system (ITS), transport safety service, etc.), a tracking service, a power metering service, an automatic payment system, a medical service, and a remote-control service may be provided.

In the present disclosure, an M2M device may be fixed or have mobility and may transmit and receive user data and/or control information through communication with an M2M server. An M2M device may be referred to as terminal equipment, a mobile station (MS), a mobile terminal (MT), a user terminal (UT), a subscribe station (SS), a wireless device, a personal digital assistant (PDA), a wireless modem, a handheld device, etc. In the present disclosure, an M2M server refers to a server for M2M communication and may be embodied as a fixed station or a mobile station. An M2M server may communicate with M2M devices and/or another M2M server to exchange data and control information. In addition, when a network connected to an M2M device is different from a network connected to an M2M server, an M2M gateway may refer to a device functioning as a node connecting one network to another network. In addition, an M2M gateway may function as an M2M device and may perform other functions, for example, managing an M2M device connected to an M2M gateway, receiving a message and forwarding the same message or a modified message to connected M2M devices (message fan out), and aggregating messages (message aggregation). The term "M2M device" may be used as a concept encompassing M2M gateway and M2M server. Accordingly, an M2M gateway and an M2M server may be referred to as an M2M device.

In addition, in the present specification, the term "entity" may be used to refer to hardware like M2M device, M2M gateway and M2M server or be used to refer to a software component of an M2M application layer and an M2M (common) service layer that will be described below.

Hereinafter, the present disclosure mainly describes an M2M system but is not solely applied thereto and may be applied, for example, to a system according to a client-server (or sender-responder) model equally/similarly.

FIG. 1 illustrates an M2M system according to an embodiment.

An M2M system defines a common M2M service framework for various M2M applications. An M2M application 10 may refer to a software component implementing M2M service solutions like e-Health, city automation, connected consumer, and automotive. In order to implement these various M2M applications, an M2M system provides common necessary functions, and the common necessary functions may be referred to as M2M services or M2M common services. When such an M2M common service is used, an M2M application may be easily implemented without necessity to configure a basic service frame again for each M2M application.

An M2M service is provided in a form of a set of service capability (SC) 20, and the M2M application 10 may access the set of SC or the SC via an open interface and may use a M2M service or function provided by the SC. The M2M service capability 20 may provide a function to configure an M2M service (e.g., device management, location, discovery, group management, registration, security, etc.). A service capabilities (SC) layer or a service capability (SC) entity may be a set of functions for an M2M service that may be used when an M2M application is provided on a service framework.

Service capability (SC) may be represented as xSC. Herein, x may be represented by one of N, G, and D and indicates where, among a network (and/or a server), a gateway, and a device, SC exists. For example, NSC indicates SC existing in a network and/or a server, and GSC indicates SC existing in a gateway.

An M2M application may exist in a network, a gateway or a device. An M2M application existing in a network or by being connected with a server may be referred to as an M2M network application and may be referred to simply as a network application (NA). For example, an NA is software that is implemented by being directly connected with a server and may perform a role of communicating with an M2M gateway or an M2M device and managing the M2M gateway and the M2M device. An M2M application existing in a device may be referred to as an M2M device application and may be referred to simply as a device application (DA). For example, a DA may be software that is implemented in an M2M device, and may forward sensor information to an NA. An M2M application existing in a gateway may be referred to as an M2M gateway application and may be referred to simply as a gateway application (GA). For example, a GA may perform a role of managing an M2M gateway and may provide an M2M service or function (e.g., service capabilities (SCs) or service capability (SC) to a DA. The M2M application may collectively refer to an application entity (AE) and an application layer.

Referring to FIG. 1, an M2M system architecture may be divided into a network domain 10 and a device and gateway domain 20. The network domain may include functions 11 for M2M system management and functions 12 for network management. A function for M2M system management may be performed by an M2M application, which manages devices existing in the device and gateway domain, and M2M Scs, and a function for network management may be performed by a core network and an access network. Accordingly, in the example shown in FIG. 1, a core network 13 and an access network 14 may provide connection between each entity rather than performing an M2M function. M2M communication may be performed between M2M SCs in the network domain 10 and the device and gateway domain 20 via the core network 13 and the access network 14, and an M2M application of each domain may provide and receive a signal or information via M2M SCs of each domain.

The access network 14 is an entity enabling an M2M device and gateway domain to communicate with the core network 13. Examples of the access network 14 are xDSL (digital subscriber line), HFC (hybrid fiber coax), satellite, GERAN, UTRAN, eUTRAN, wireless LAN, WiMAX and the like.

The core network 13 may be an entity providing such functions as IP (Internet protocol) connection, service and network control, interconnection, roaming and the like. The core network 13 may include a 3GPP (3rd Generation Partnership Project) core network, an ETSI TISPAN (Telecommunications and Internet converged Services and Protocols for Advanced Networking) core network, a 3GPP2 core network, and the like.

An M2M SC (service capability) 15 provides an M2M common service function (CSF), which may be shared by various M2M network applications, and exposures an M2M service via an open interface, thereby enabling M2M applications 16 to use the M2M service. M2M service capability layer (SCL) may refer to a layer including such M2M SC entities or M2M common service functions.

The M2M application 16 is an entity capable of operating a service logic and using M2M SCs (service capabilities) via an open interface. An M2M application layer may refer to a layer including the M2M application and a related operational logic.

An M2M device 21 is an entity that operates an M2M device application via M2M SCs (service capabilities). The M2M device 21 may directly communicate with an M2M server of a network domain, and may also communicate with the M2M server of the network domain via an M2M gateway 22. When being connected via the M2M gateway 21, the M2M gateway 22 operates like a proxy. The M2M device 21 may include an M2M application and/or M2M SCs (service capabilities).

An M2M area network 23 provides connectivity between an M2M device and an M2M gateway. In this case, a network between the M2M gateway and an M2M server and a network between the M2M device and the M2M gateway may be different from each other. As an example, the M2M area network may be implemented using a PAN (personal area network) technology such as IEEE 802.15.1, Zigbee, Bluetooth, IETF ROLL, and ISA 100.11a and a local network technology such as PLC (power line communication), M-BUS, wireless M-BUS, and KNX.

The M2M gateway 22 may be an entity that manages an M2M application via M2M SCs (service capabilities) and provides a service for the M2M application. The M2M gateway 22 may perform a role of a proxy between the M2M device 21 and the network domain 10 and may perform a role of providing a service to a non-compliant M2M device. The M2M gateway 22 may refer to an entity having a function of a gateway among the M2M devices 21. The M2M gateway 22 may include an M2M application and/or M2M SCs (service capabilities).

The M2M system architecture illustrated in FIG. 1 is just an example, and the name of each entity may vary. For example, an M2M SC (service capability) may be referred to as an M2M common service function (CSF), and an SCL (service capability layer) may be referred to as a common service layer (CSL) or a common service entity (CSE). In addition, an M2M application may be referred to as an application entity (AE), and an M2M application layer may be simply referred to as an application layer. Likewise, the name of each domain may vary. As an example, in a oneM2M system, a network domain may be referred to as an infrastructure domain, and a device and gateway domain may be referred to as a field domain.

As illustrated in FIG. 1, an M2M system may be construed as a layered structure including an M2M application layer and an M2M SC (service capability) layer for M2M communication.

Figure 2:
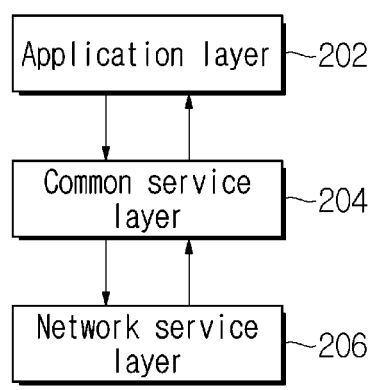
FIG. 2 illustrates a layered structure of an M2M system according to an embodiment.

FIG. 2 illustrates a layered structure of an M2M system according to an embodiment.

Referring to FIG. 2, an M2M system may include an application layer 202, a common service layer 204, and an underlying network services layer 206. As described above, the application layer 202 may correspond to an M2M application layer, and the common service layer 204 may correspond to an M2M SCL. The underlying network services layer 206 provides services such as device management, a location service, and device triggering to the common service layer 204 in a core network.

Figure 3:
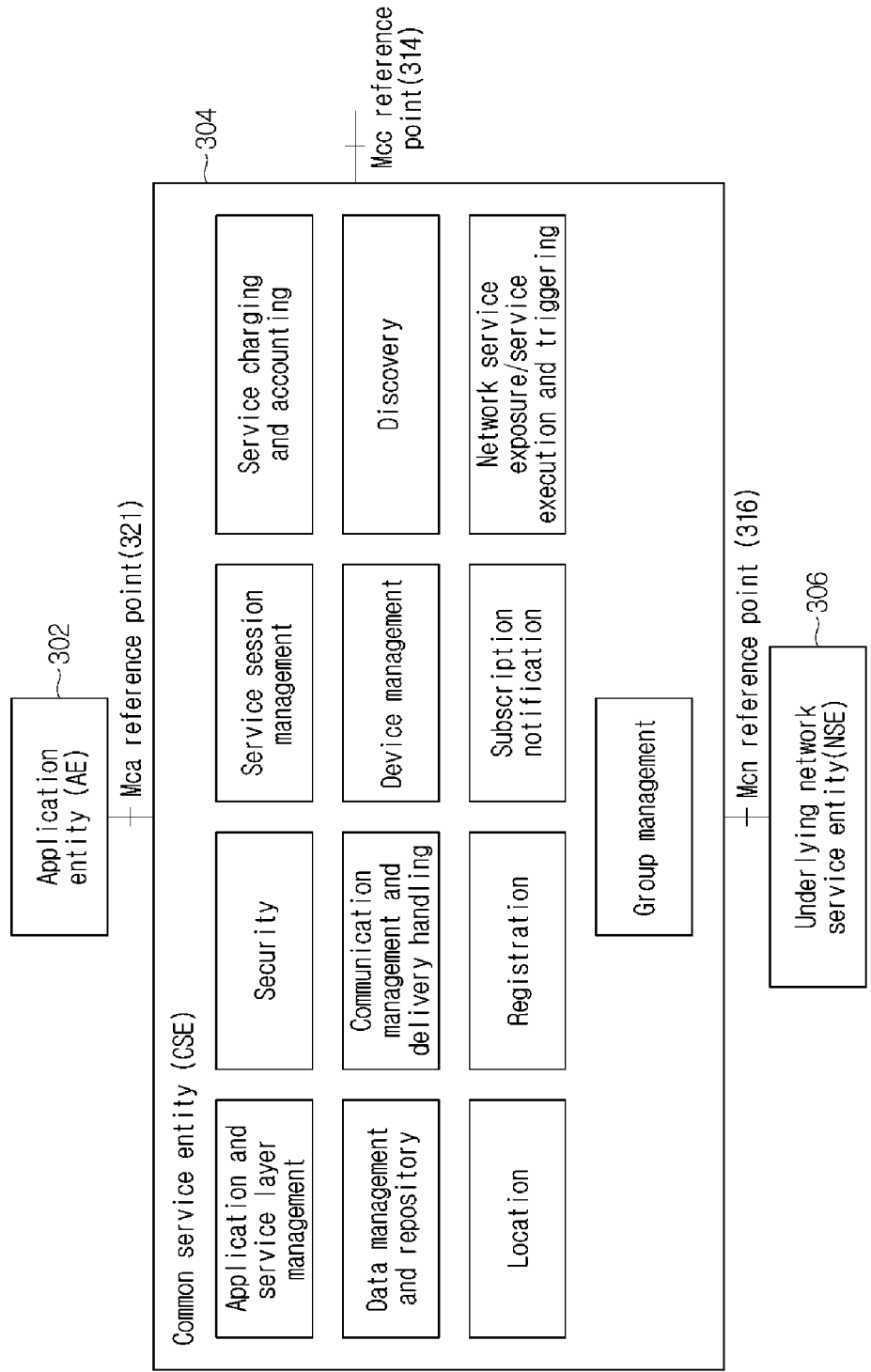
FIG. 3 illustrates a communication flow between each entity according to an embodiment.

Referring to FIG. 3, an Mca reference point 312 may designate a communication flow between an application entity (AE) 302 and a common service entity (CSE) 304. The Mca reference point 312 enables the AE 302 to use a service provided by the CSE 304 and enables the CSE 304 to communicate with the AE 302. The Mca reference point 312 may refer to an interface between an M2M application layer and an M2M common service layer (or entity).

The Mcc reference point 314 may designate a communication flow between different common service entities (CSEs) 304. The Mcc reference point 314 enables the CSE 304 to use a service of another CSE when the CSE 304 provides necessary functions. A service provided through the Mcc reference point 314 may be dependent on the functions supported by the CSE 304. The Mcc reference point 314 may refer to an interface between M2M common service layers.

An Mcn reference point 316 may designate a communication flow between the CSE 304 and the underlying network service entity (NSE) 306. In order to make the CSE 304 provide required functions, the Mcn reference point 316 enables the CSE 304 to use a service provided by the NSE 306. The Mcn reference point 316 may refer to an interface between an M2M common service layer and an M2M underlying network layer.

Also, in the example shown in FIG. 3, the CSE 304 may provide various common service functions/capabilities. For example, the CSE 304 may include at least one of an application and service layer management function, a communication management and delivery handling function, a data management and repository function, a device management function, a group management function, a discovery function, a location function, a network service exposure/service execution and triggering function, a registration function, a security function, a service charging and accounting function, a service session management function, and a subscription/notification function. The CSE 304 indicates an instance of the common service functions and provides a subset of the common service functions that M2M applications may use and share. The common service functions may be briefly described as follows.

Application and service layer management (ASM): provides a function of managing AEs and CSEs. For example, the ASM function may not only configure, trouble and upgrade a function of CSEs but also upgrade a function of AEs.

Communication management and delivery handling (CMDH): provides a communication with other CSEs, AEs, and NSEs. For example, the CMDH function may determine when and how to use a connection for CSE-to-CSE communication and may control specific requests to be delayed in delivery.

Data management and repository (DMR): enables M2M applications to exchange and share data with each other. For example, the DMR function may collect and aggregate a great amount of data and covert and store the data into a specific format.

Device management (DMG): manages a device function not only for an M2M gateway and an M2M device but also for devices existing in an M2M area network. For example, the DMG function may perform application installation and configuration, firmware update, logging, monitoring, diagnostics, network topology management and the like.

Discovery (DIS): may search for information and a resource ([0054]) within a given range and condition according to a request.

Group management (GMG): for example, a group may be generated by combining a resource, an M2M device or an M2M gateway, and a group-related request may be handled.

Location (LOC): may enables an M2M application to obtain location information of an M2M device or an M2M gateway.

Network service exposure/service execution and triggering (NSSE): enables communication of an underlying network to be performed and makes a service or a function provided by the underlying network available.

Registration (REG): enables an M2M application or another CSE to process registration to a specific CSE. The registration may be performed to use an M2M service function of the specific CSE.

Security (SEC): may perform roles like handling of sensitive data such as a security key, establishing security-related association, authentication, authorization, protecting ID (identity).

Service charging and accounting (SCA): may perform a role of providing a charging function to an AE or CSE.

Service session management (SSM): may perform a role of managing an M2M session of a service layer for end-to-end communication.

Subscription/notification (SUB): in case of subscription of a change for a specific resource, when the resource is changed, performs a role of notifying the change.

Figure 4:
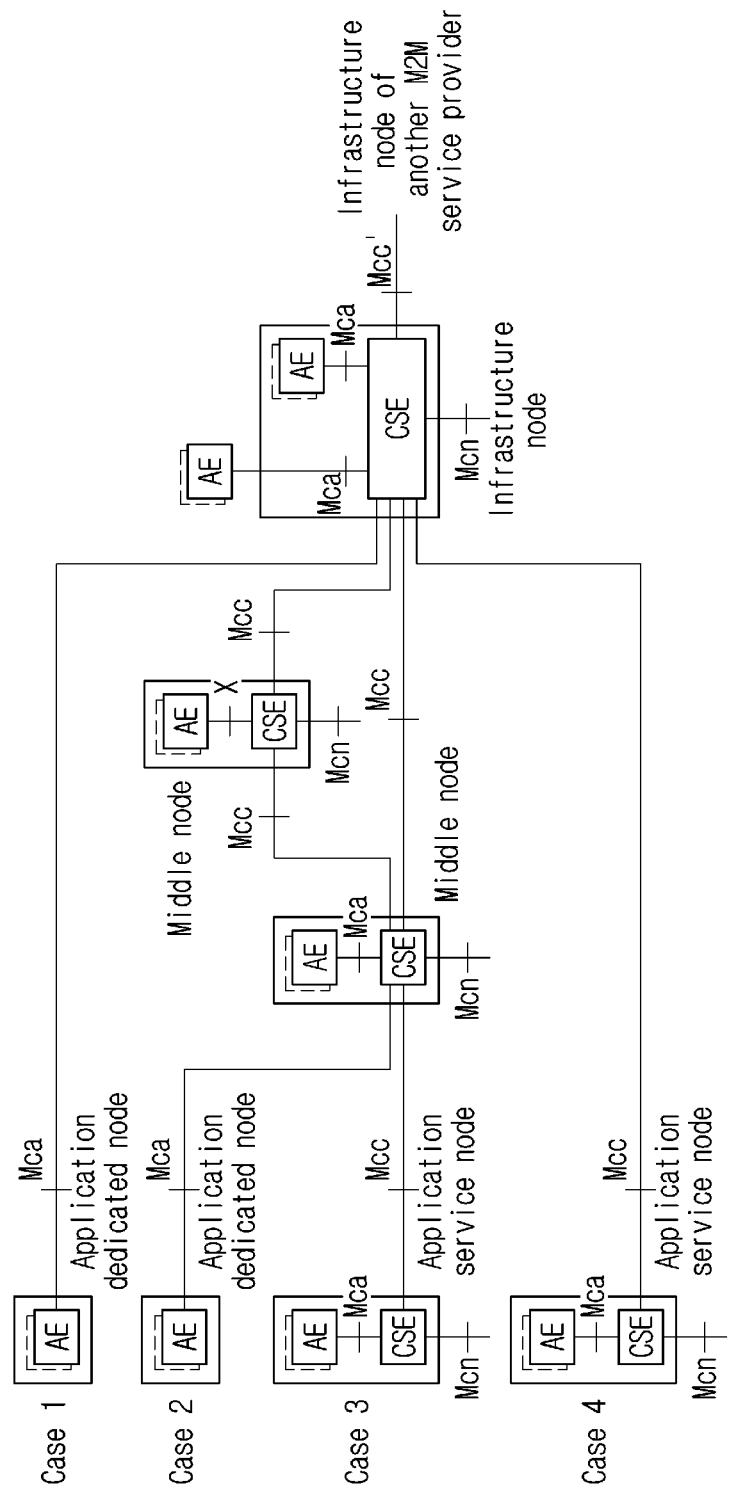
FIG. 4 illustrates a configuration of an M2M system according to an embodiment.

FIG. 4 illustrates a configuration of an M2M system according to an embodiment. In the present specification, a node means an entity including one or more M2M applications or an entity including one CSE and zero or more M2M application.

An application dedicated node (ADN) may refer to a node including at least one or more application entities (AEs) but not including a common service entity (CSE). The ADN may communicate with one middle node (MN) or one infrastructure node (IN) via a Mca. The ADN may be referred to as an M2M device having a constrained capability. The M2M device having a constrained capability may refer to an M2M device not including a common service layer or a common service entity (CSE). The M2M device having a constrained capability may be simply referred to as a constrained M2M device.

An application service node (ASN) may refer to a node having at least one common service entity (CSE) and at least one M2M application entity (AE). The ASN may communicate with one middle node or one infrastructure node via a Mcc. The ASN may be referred to as an M2M device.

A middle node (MN) may refer to a node including one common service entity (CSE) and zero or more M2M application entity (AE). The MN may communicate with one infrastructure node (IN) or another middle node (MN) via a Mcc, or may communicate with IN/MN/ASN via the Mcc, or may communicate with an ADN via a Mca. The MN may be referred to as an M2M gateway.

An infrastructure node (IN) may refer to a node having one common service entity (CSE) and having zero or more application entity (AE). The IN may communicate with at least one middle node (MN) via a Mcc and/or may communicate with at least one ASN. Alternatively, the IN may communicate with one or more ADNs via a Mca. The IN may be referred to as an M2M server.

Referring to FIG. 4, Case 1 shows an example of communication between an ADN and an IN. The ADN may be an M2M device having a constrained capability. In this case, since the ADN does not have a CSE or a common service layer, the ADN may communicate with a CSE of the IN via Mca. Also, in this case, since the ADN does not have a CSE or a common service layer, the ADN may not store/share data generated by an AE or an application layer in/with another entity. Accordingly, in Case 1, the data generated by the AE or the application layer of the ADN may be stored and shared in the CSE of the IN.

As an example, Case 2 shows an example of communication between an ADN and an MN. The ADN may also be an M2M device having a constrained capability. Accordingly, the ADN may operate similarly to Case 1 except that the ADN communicates with a CSE of the MN. That is, the ADN may communicate with the CSE of the MN via Mca. Also, since the ADN does not have a CSE or a common service layer, the ADN may not store/share data generated by an AE or an application layer in/with another entity. Accordingly, the data generated by the AE or the application layer of the ADN may be stored and shared in the CSE of the MN.

Meanwhile, in Case 2, an MN may communicate with an IN via an MN. In this case, an MN and another MN may communicate with each other, and an MN and an IN may communicate with each other via Mcc. An MN may directly communicate with an IN without an MN in between.

Case 3 shows an example of communication between an ASN and an MN. Unlike Case 1 or Case 2, since an ASN has includes a CSE or a common service layer, data generated by an AE or an application layer of the ASN may be stored in the CSE or the common service layer of the ASN. Also, the AE of the ASN may communicate with a CSE of an MN via the CSE of ASN.

Case 4 shows an example of communication between an ASN and an MN. Compared to Case 3, a CSE of the ASN may directly communicate with a CSE of an IN without an MN in between.

An IN may be located in an infrastructure domain or a network domain and may include one CSE and zero or more AE. INs may communicate with each other via Mcc.

Figure 5:
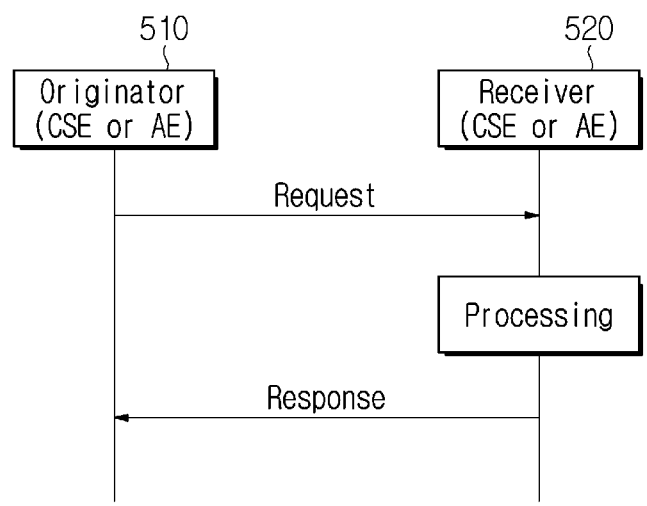
FIG. 5 is a view illustrating a method of exchanging a message between an originator and a receiver.

FIG. 5 is a view illustrating a method of exchanging a message between an originator and a receiver.

Referring to FIG. 5, an originator 510 may transmit a request message to a receiver 520. Herein, the originator 510 and the receiver 520 may be the above-described M2M terminals. However, the originator 510 and the receiver 520 are not limited to the M2M terminals and may be other terminals and are not limited to the above-described embodiment. Also, as an example, the originator 510 and the receiver 520 may be the above-described nodes, entities, servers or gateways. That is, the originator 510 and the receiver 520 may be hardware or software configurations and are not limited to the above-described embodiment.

Herein, as an example, a request message transmitted by the originator 510 may include at least one or more parameters. Herein, as an example, a parameter may be a mandatory parameter or an optional parameter. As an example, a parameter related to a transmitting end, a parameter related to a receiving end, an identification parameter, and an operation parameter may be mandatory parameters. In addition, optional parameters may be related to other types of information. Herein, the parameter related to a transmitting end may be a parameter for the originator 510. In addition, the parameter related to a receiving end may be a parameter for the receiver 520. In addition, the identification parameter may be a parameter required for identification of each other.

In addition, the operation parameter may be a parameter for distinguishing operations. As an example, the operation parameter may be set to any one among Create, Retrieve, Update, Delete, and Notify. That is, the operation parameter may be a parameter to distinguish operations.

Herein, when receiving a request message from the originator 510, the receiver 520 may process the message. As an example, the receiver 520 may perform an operation included in the request message. For the operation, the receiver 520 may determine whether or not a parameter is valid and whether or not the parameter is authorized. Herein, when the parameter is valid and is authorized, the receiver 520 may check whether or not there is a target resource to be requested and may perform processing accordingly.

As an example, in case an event occurs, the originator 510 may transmit a request message including a parameter for notification to the receiver 520. The receiver 520 may confirm the parameter for the notification included in the request message and may perform an operation accordingly. The receiver 520 may transmit a response message to the originator 510.

Hereinafter, each resource and an attribute of the resource will be described. As an example, resources and attributes below are described with names in consideration of the features of the resources or attributes but are not limited thereto. That is, a resource or an attribute having a same or similar feature to a resource or an attribute described below may be applied in the same manner as in the present disclosure. However, for the convenience of explanation, resources and attributes are described with specific names considering their features, and related description will be presented based on the features. However, the present disclosure is not limited thereto.

Figure 6:
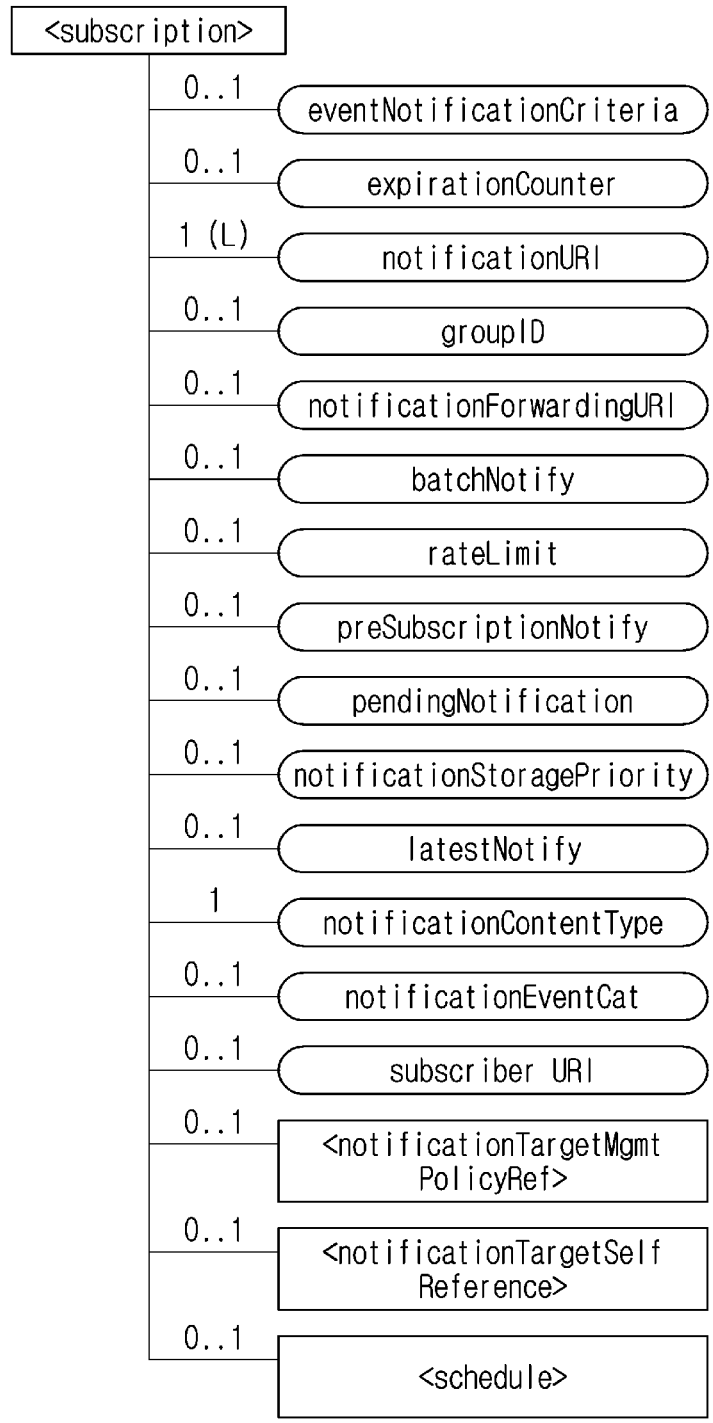
FIG. 6 is a view illustrating attribute information for a subscription resource.

FIG. 6 is a view showing an attribute for a subscription resource.

Referring to FIG. 6, a subscription resource may include attributes. As an example, the attributes of a subscription resource are described in FIG. 6. However, this is only illustrative and addition, deletion or modification is possible. Herein, information required for subscription-notification may be shared through an attribute for a subscription resource. Also, as an example, information required to perform a necessary operation for subscription-notification may be defined as attribute information but is not limited to the above-described embodiment. As an example, "expirationCounter" may be included in a subscription resource, which will be described below.

Meanwhile, as an example, M2M terminals in an M2M system may operate based on subscription-notification. More specifically, in an MP2M platform, an event may be registered via a subscription resource, and when the event occurs, a notification message may be delivered.

As an example, a target system may allocate a subscription resource to a hosting system, and when an event occurs, the hosting system may deliver a notification message to the target system. Herein, the hosting system and the target system may be entities that operate based on the above-described M2M terminal.

Figure 7:
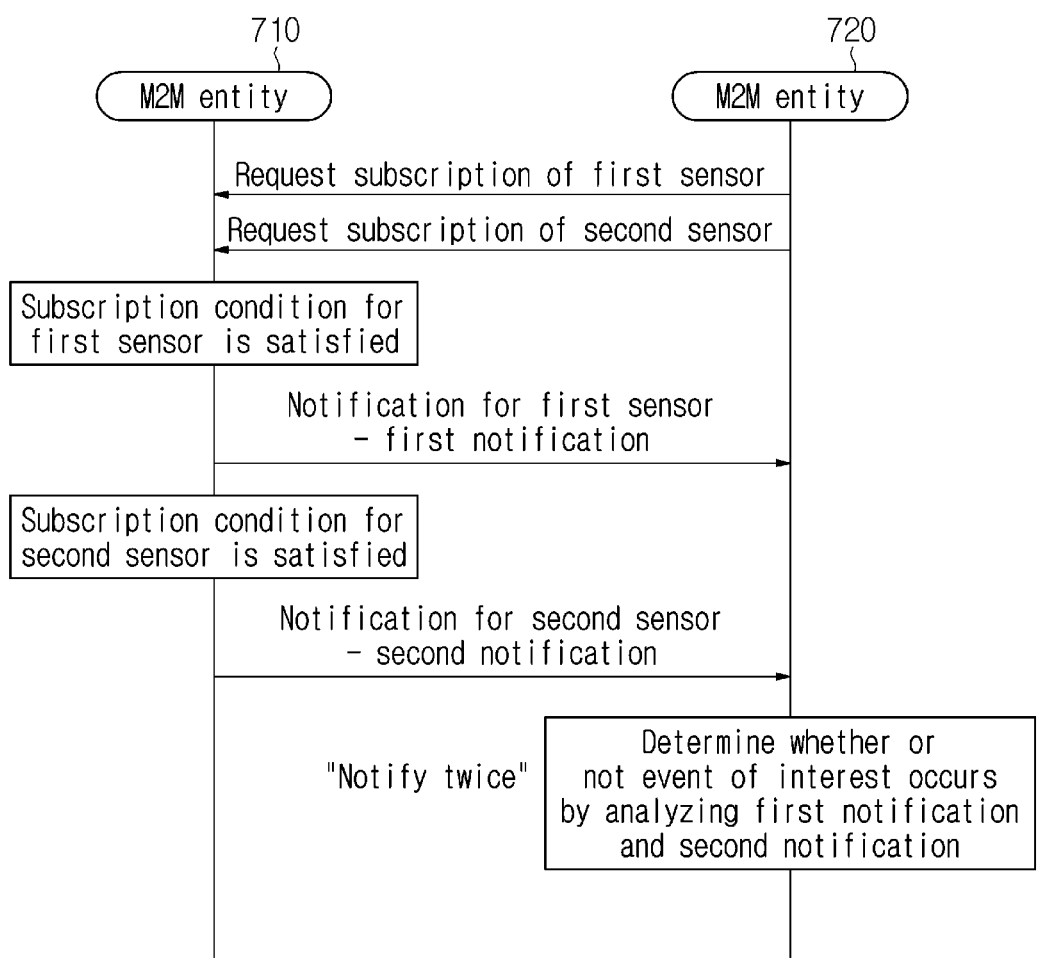
FIG. 7 and FIG. 8 are views illustrating a method of operating based on a cross resource.

FIG. 7 is a view showing a method of notifying a resource. As an example, referring to FIG. 7, a subscriber 720 as an M2M entity may request subscription to a resource host 710 as an M2M entity. Herein, as an example, referring to FIG. 7, the subscriber 720 may request subscription to a plurality of subscribers. As an example, the subscriber 720 may request subscription for a first sensor and subscription for a second sensor to the resource host 710. Meanwhile, as an example, notification for each subscription may be transmitted not to the subscriber 720 but to another subject. However, for the convenience of explanation, the subscriber 720 receives a notification in the description below, but the present disclosure is not limited thereto.

Herein, as an example, when a subscription condition for the first sensor is satisfied, the subscriber 720 may receive a first notification, which is a notification for the first sensor, from the host 710. Also, as an example, when a subscription condition for the second sensor is satisfied, the subscriber 720 may receive a second notification, which is a notification for the second sensor, from the host 710. That is, the first notification and the second notification may be notified based on respective subscription resources according to each condition. However, as an example, the first notification and the second notification may be notifications associated with a same event. As an example, the event may be a fire detecting event, and the first notification and the second notification may be notifications that are associated with a temperature sensor and a smoke sensor respectively. Also, as an example, the event may be a speeding notification event, and the first notification and the second notification may be notifications that are associated with sensing of a speed camera and exceeding of a preset speed respectively. That is, as described above, the first notification and the second notification may be notifications for events that are associated with each other. Herein, in the case described above, the subscriber 720 may determine whether or not an event of interest occurs by analyzing the first notification and the second notification. That is, the subscriber 720 may confirm whether or not an event of interest occurs based on each notification and an additional operation.

Figure 8:
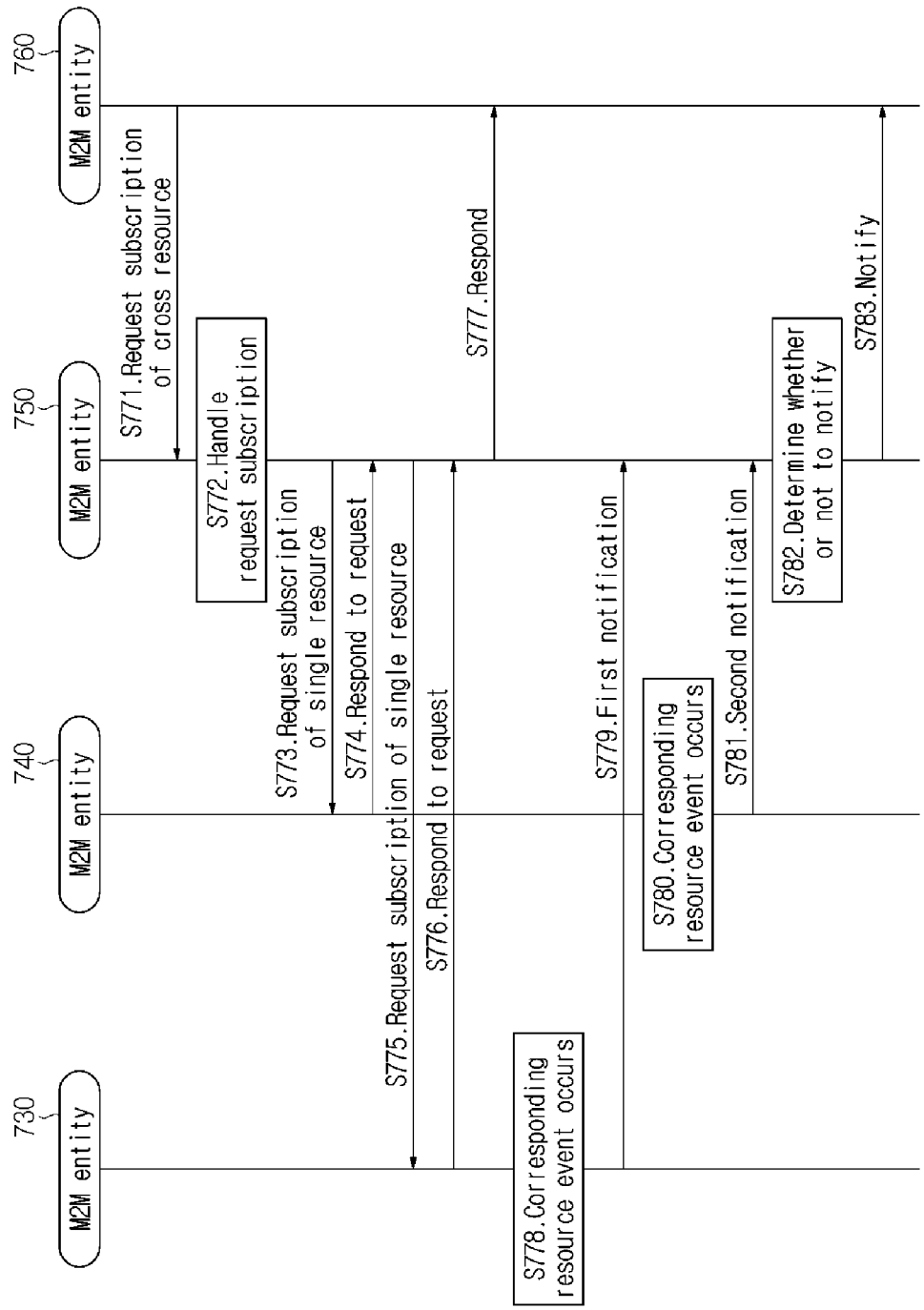

Herein, as an example, FIG. 8 is a view illustrating a method of operating based on a cross resource. Based on what is described above, subscription for a same event of interest may be processed together based on a cross resource. More specifically, a host (e.g., IN-CSE) 750 as an M2M entity may transmit a request message for cross resource subscription to a subscriber (e.g., IN-AE) 760 as an M2M entity. Herein, the subscriber 760 may want to receive a single notification under a predetermined criterion based on modification of a plurality of resources as target resources. That is, the subscriber 760 may receive a single notification based on satisfaction of a condition for a plurality of resources through a cross resource. Herein, as an example, a cross resource request may include the information described in Table 1 below. As an example, a cross may indicate a type of a time window for cross resource subscription as a sliding time window. Also, "timeWindowSize" may indicate a size for time window and is not limited to the above-described embodiment.

TABLE 1

Figure 9:
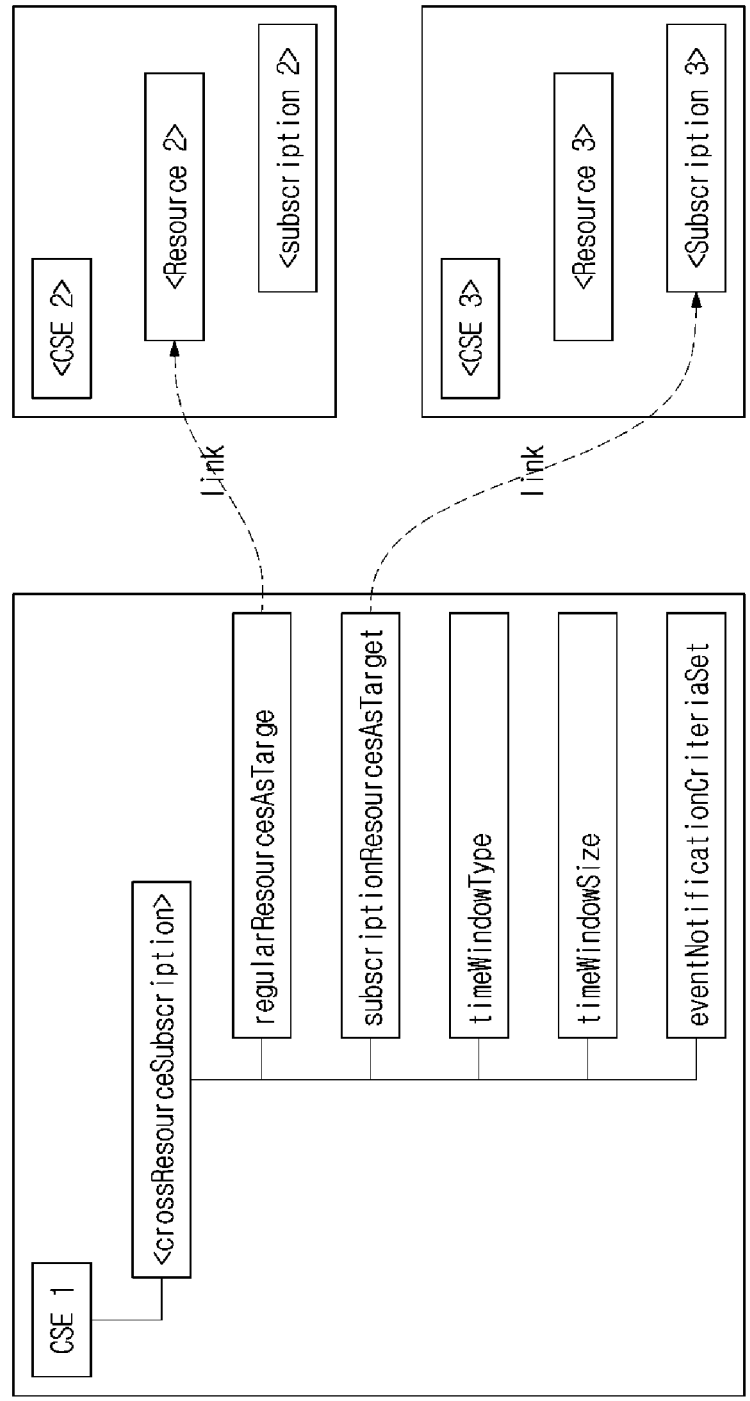
FIG. 9 is a view illustrating attribute information for cross-resource subscription.

| Attributes of | Multiplicity | RW/RO/WO | Description |
|---|---|---|---|
| notificationContentType | 1 | RW | See clause 9.6.8 |
| notificationEventCat | 0 . . . 1 | RW | See clause 9.6.8 |
| subscriberURI | 0 . . . 1 | RW | See clause 9.6.8 |
| regularResourcesAsTarget | 0 . . . 1(L) | RW | This attribute indicates a list of regular resources (i.e. normal resources rather than <subscription> resources), which shall be used as the target resource for this cross-resource subscription. Here, the regular resource is referred to as any subscribable oneM2M resources. |
| subscriptionResourcesAsTarget | 0 . . . 1(L) | RW | This attribute indicates a list of existing <subscription> resources, which shall be used as the target resource for this cross-resource subscription. |
| timeWindowType | 1 | RW | This attribute indicates the type of time window mechanisms (e.g. timeWindowType = 1 stands for periodic time window without any overlapping and timeWindowType = 2 represents sliding time window where current time window will be slided to become next time window when a cross-resource notification is generated for instance) which will be used to determine the generation of a cross-resource notification. |
| timeWindowSize | 1 | RW | This attribute indicates the size or time duration (e.g. in seconds) of the time window, based on which cross-resource notifications shall be generated. Note that the maximum window size (e.g. 60 seconds) may be enforced by the Hosting CSE for a subscriber; if the timeWindowSize indicated or requested by a subscriber is larger than the maximum window size, the Hosting CSE may reject the subscriber' |
| eventNotificationCriteriaSet | 0 . . . 1(L) | RW | This attribute lists eventNotificationCriteria for each regular target resource as indicated in regularResourcesAsTarget attribute and involved in a cross-resource subscription. If there is only one eventNotificationCriteria contained in this attribute, it shall be applied to all target resources as indicated by regularResourcesAsTarget attribute. If only subscriptionResourcesAsTarget attribute appears (i.e. no regularResourcesAsTarget attribute), eventNotificationCriteriaSet shall not be needed. See clause 9.6.8 for the description of eventNotificationCriteria. | resource request may include "regularResourcesAsTarget" and "subscriptionResourcesAsTarget" information. Herein, as an example, referring to FIG. 9, "regularResourcesAsTarget" may include list information of a regular resource, which may become a target, in a target resource available for cross resource subscription. Herein, the regular resource may include at least any one of subscribable oneM2M resources but is not limited to the above-described embodiment. Also, as an example, "subscriptionResourcesAsTarget" may mean a resource that exists for actual subscription. That is, "subscriptionResourcesAsTarget" may mean an actual subscription resource as a target resource that is used for cross resource subscription. That is, it may include target resource information that becomes a target of the occurrence of notification. Also, as an example, "timeWindowType" may indicate a certain window without overlap as a type for a time window for cross resource subscription or Meanwhile, as another example, in the case of a cross resource, only when a plurality of notifications are all satisfied, the cross resource may be meaningful. When it is impossible to perform a notification for one resource, all the notifications may be problematic. In consideration of the above description, when transmitting a request for a single resource, the host 750 may transmit the request to respective M2M entities 730 and 740 with indication that the request is for a cross resource. Thus, each of the M2M entities 730 and 740 may recognize that it is a single resource notification due to the cross resource. Herein, as an example, in case each of the M2M entities 730 and 740 receives a message indicating that it is not the cross resource, when each of the M2M entities 730 and 740 is in a state incapable of notification, each of the M2M entities 730 and 740 may transmit a message regarding the incapability of notification to the host 750. On the other hand, as an example, in case each of the M2M entities 730 and 740 receives a message indicating that it is the cross resource, when each of the M2M entities 730 and 740 is in a state incapable of notification, each of the M2M entities 730 and 740 may transmit a message regarding the incapability of notification to the host 750 and the subscriber 760. That is, considering a cross resource, when each of the M2M entities 730 and 740 in a state incapable of notification, since the entire cross resource may be meaningless, each of the M2M entities 730 and 740 may transmit a message regarding the incapability of notification also to the subscriber 760 but is not limited to the above-described embodiment.

Also, as an example, each of the M2M entities 730 and 740 may transmit a response message regarding a single resource subscription request to the host 750 (S774, S776). That is, each of the M2M entities 730 and 740 may determine whether or not to permit a single resource subscription and may transmit a corresponding response to the host 750. Next, the host 750 may transmit a final response to the subscriber 760.

Next, in each of the M2M entities 730 and 740, an event for a target resource may occur (S778, S780). Herein, each of the M2M entities 730 and 740 may transmit a first notification (S779) and a second notification (S781) to the host 750 respectively. Herein, the host 750 may buffer the notifications described above. Herein, as an example, based on the above-described cross resource attribute information, the host 750 may determine whether or not the first notification and the second notification agree with matched criteria. The host 750 may determine whether or not a notification is transmitted to the subscriber 760 by executing window mechanisms. As an example, when both the first notification and the second notification are received during a designated time window, the host 750 may generate a notification and transmit the notification to the subscriber 760 (S783). As an example, the host 750 may determine whether or not a notification is transmitted to the subscriber 760 by considering the order of occurrence for the first notification and the second notification within a specified time window size, which will be described below. That is, in the case of cross resource subscription, when the subscriber 760 wants cross notification in consideration of an order of event matching for a first sensor and a second sensor, the cross notification may be performed. As an example, when a subscription condition for the first sensor is to be satisfied first, even if a notification for the second sensor is made first, a time window mechanism may not be executed. That is, the host 750 may start the time window mechanism only after receiving a notification to be satisfied first. Also, as an example, when the host 750 transmits a notification to the subscriber 760, a notification message may be an indication for triggering an operation based on a preconfigured rule, although being dependent merely on an application. As an example, when an event is a fire detection, the host 750 may transmit a command to a sensor and perform spraying for fire suppression. That is, based on a notification message, the host 750 may transmit a notification to the subscriber and implement a necessary measure at the same time.

Also, as an example, when an event is vehicle monitoring, the host 750 may make a notification to the subscriber 760 when detecting damage of a vehicle based on a first sensor and a second sensor. At the same time, the host 750 may take an image based on a preset rule and store information on the image thus taken, but is not limited to the above-described embodiment.

Based on the above description, subscription and notification for a resource or subscription and notification for a cross resource may be performed. Herein, attribute information on subscription may be the same as FIG. 6 described above, and detailed attribute information may be described as in Table 2 below. However, Table 2 is only one example of subscription attribute information, and other attribute information may be set. That is, information related to subscription and notification may be set as attribute information. Herein, as an example, in Table 2, information regarding the permission of read/write for each attribute may be indicated according to each attribute. As an example, the above-described information may be one of READ/WRITE (RW), READ ONLY (RO), and WRITE ONLY (WO). Also, as an example, the multiplicity in Table 2 may indicate the number of times a corresponding attribute may occur in a subscription resource. Herein, Table 2 below is only one example, and other attribute information may be additionally set as a subscription resource attribute.

TABLE 2

| Attributes of <subscription> | Multiplicity | RW/RO/WO | Description |
|---|---|---|---|
| eventNotificationCriteria | 0 . . . 1 | RW | This attribute (notification policy) indicates the event criteria for which a notification is to be generated. When no eventNotificationCriteria attribute is present in a <subscription> resource, the Hosting CSE shall trigger notifications for this subscription when any of the attributes of the subscribed-to resource is modified. |
| expirationCounter | 0 . . . 1 | RW | This attribute (notification policy) indicates that the subscriber wants to set the life of this subscription to a limit of a maximum number of notifications. When the number of notifications sent reaches the count of this counter, the <subscription> resource shall be deleted, regardless of any other policy. |
| notificationURI | 1 (L) | RW | This attribute shall be configured as a list consisting of one or more targets that the Hosting CSE shall send notifications to. A target shall be formatted as a oneM2M compliant Resource-ID as defined in clause 7.2 or as an identifier compliant with a oneM2M supported protocol binding (e.g. http, coap, mqtt). |
| . | . | | . |
| . | . | | . |
| . | . | | . |

TABLE 2-continued

| Attributes of <subscription> | Multiplicity | RW/RO/WO | Description |
|---|---|---|---|
| subscriberURI | 0 . . . 1 | WO | This attribute shall be configured with the target of the subscriber. The target is used by the Hosting CSE to determine where to send a notification when the subscription is deleted. A target shall be formatted as a oneM2M compliant Resource-ID as defined in clause 7.2 or as an identifier compliant with one of the oneM2M supported protocol bindings (the detailed format of which are defined by each respective oneM2M protocol binding specification). |
| associatedCrossResourceSub | 0 . . . 1 | RW | This attribute lists the identifier of <crossResourceSubscription> resources where this <subscription> is involved in. |

Also, as an example, regarding subscription and notification, eventNotificationCriteria attribute is a list of modification and change conditions for a resource to be subscribed, and may be described as in Table 3 below. However, Table 3 shows only some information on event notification criteria attributes, and further information may be included. Herein, respective conditions of the eventNotificationCriteria attribute list may be in a logical AND relationship. As an example, when the eventNotificationCriteria attribute includes 2 conditions, if the modification/change of a resource to be subscribed satisfies the 2 conditions, a notification may be transmitted. That is, based on what is described above, an amount of notification message may be adjusted by setting the eventNotificationCriteria attribute in a subscription resource. When the set eventNotificationCriteria attribute is satisfied, a notification may be transmitted to a notification target entity so that the problem of a flood of notification messages may be prevented.

TABLE 3

| Condition tag | Multiplicity | Matching condition |
|---|---|---|
| createdBefore | 0 . . . 1 | The creationTime attribute of the resource is chronologically before the specified value. |
| createdAfter | 0 . . . 1 | The creationTime attribute of the resource is chronologically after the specified value. |
| modifiedSince | 0 . . . 1 | The lastModifiedTime attribute of the resource is chronologically after the specified value. |
| unmodifiedSince | 0 . . . 1 | The lastModifiedTime attribute of the resource is chronologically before the specified value. |
| stateTagSmaller | 0 . . . 1 | The stateTag attribute of the resource is smaller than the specified value. |
| stateTagBigger | 0 . . . 1 | The stateTag attribute of the resource is bigger than the specified value. |
| expireBefore | 0 . . . 1 | The expirationTime attribute of the resource is chronologically before the specified value. |
| expireAfter | 0 . . . 1 | The expirationTime attribute of the resource is chronologically after the specified value. |
| sizeAbove | 0 . . . 1 | The contentSize attribute of the <contentInstance> resource is equal to or greater than the specified value. |
| sizeBelow | 0 . . . 1 | The contentSize attribute of the <contentInstance> resource is smaller than the specified value. |
| notificationEventType | 0 . . . 6 | The type of event that shall trigger a notification. If multiple notificationEventType tags are present, a notification shall be triggered if any of the configured events occur. Note that not all permutations of event type are meaningful. Possible notification event type values are:<br>A. Update to attributes of the subscribed-to resource<br>B. Deletion of the subscribed-to resource,<br>C. Creation of a direct child of the subscribed-to resource,<br>D. Deletion of a direct child of the subscribed-to resource<br>E. An attempt to retrieve a <contentInstance> direct-child-resource of a subscribed-to <container> |
| . . . | . . . | . . . |
| attribute | 0 . . . n | A list of attribute names of a subscribed-to-resource. This list is only applicable when notificationEventType has a value of "Update to attributes of the subscribed-to resource". or " "<br>If this list is present, then it is used to specify a subset of a subscribed-to resource's attributes for which updates shall result in a notification. If ANY attribute specified on this list is updated, then a notification shall be generated. If an attribute that is not specified in this list is updated, then a notification shall not be generated. |

TABLE 3-continued

| Condition tag | Multiplicity | Matching condition |
| --- | --- | --- |
| | | If this list is not presented, then the default attribute list is the full set of a subscribed-to resource's attributes. If ANY attribute of a subscribed-to resource is updated, then a notification shall be generated. |
| childResourceType | 0 . . . 1 (L) | A list of resource types. This list is only applicable when notificationEventType has a value of "Creation of a direct child of the subscribed-to resource". If this list is present, then it is used to specify a subset of resource type for direct child resource of which creation shall result in a notification. If ANY resource type specified on this list is created, then a notification shall be generated. If a resource type that is not specified in this list is created, then a notification shall not be generated. If this list is not present, then the default resource type list is the full set of a direct child resource. |
| missingData | 0 . . . 1 | The missingData includes two values: a minimum specified missing number of the Time Series Data within the specified window duration, and the window duration. The condition only applies to subscribed-to resources of type <timeSeries>. The missingData includes two values: a minimum specified missing number of the Time Series Data within the specified window duration, and the window duration. The condition only applies to subscribed-to resources of type <timeSeries>. The first detected missing data point starts the timer associated with the window duration. The window duration is restarted upon its expiry until such time as the entire subscription is terminated or not refreshed. More details about NOTIFICATIONS related to data reporting is found in section 10.2.39 |
| filterOperation | 0 . . . 1 | Indicates the logical operation (AND/OR) to be used for the condition tags createdBefore, createdAfter, modifiedSince, unmodifiedSince, stateTagSmaller, stateTagBigger, expireBefore, expireAfter, sizeAbove, sizeBelow. The default value is logical AND. |

Figure 10:
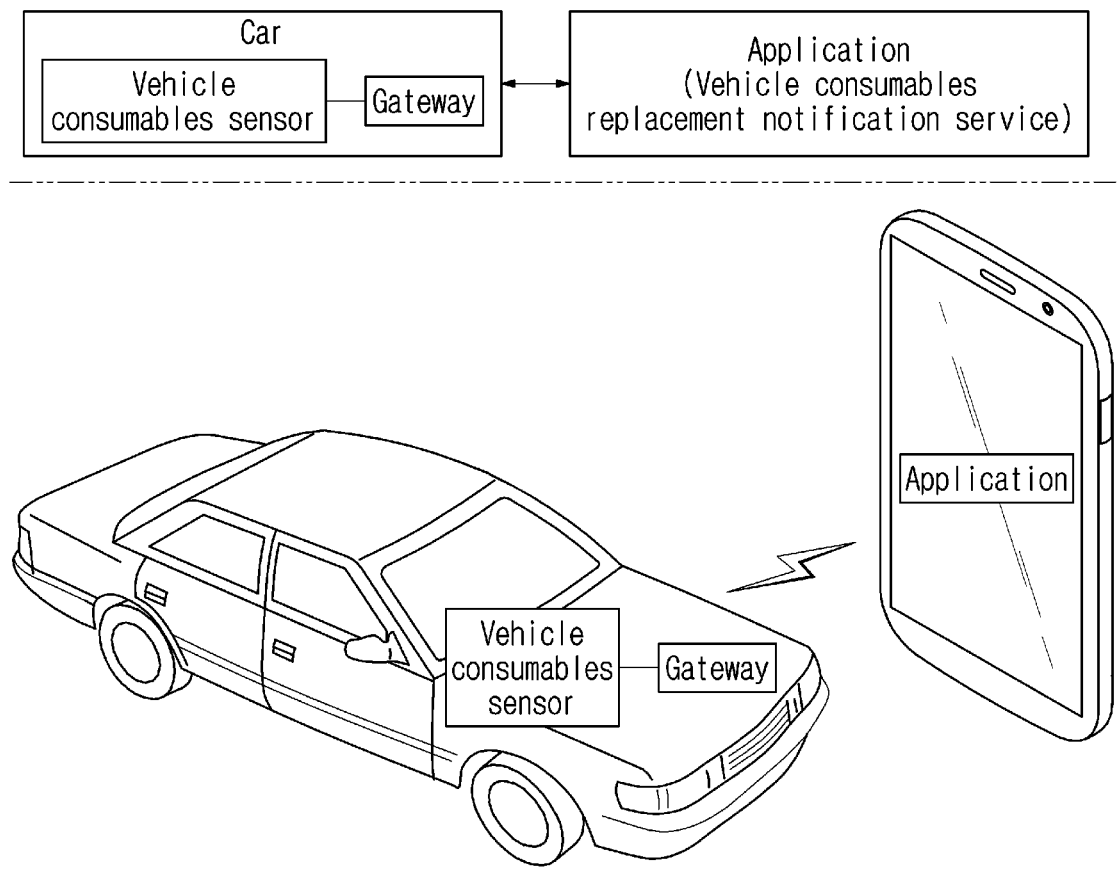
FIG. 10 is a view illustrating a subscription and notification operation.
Figure 11:
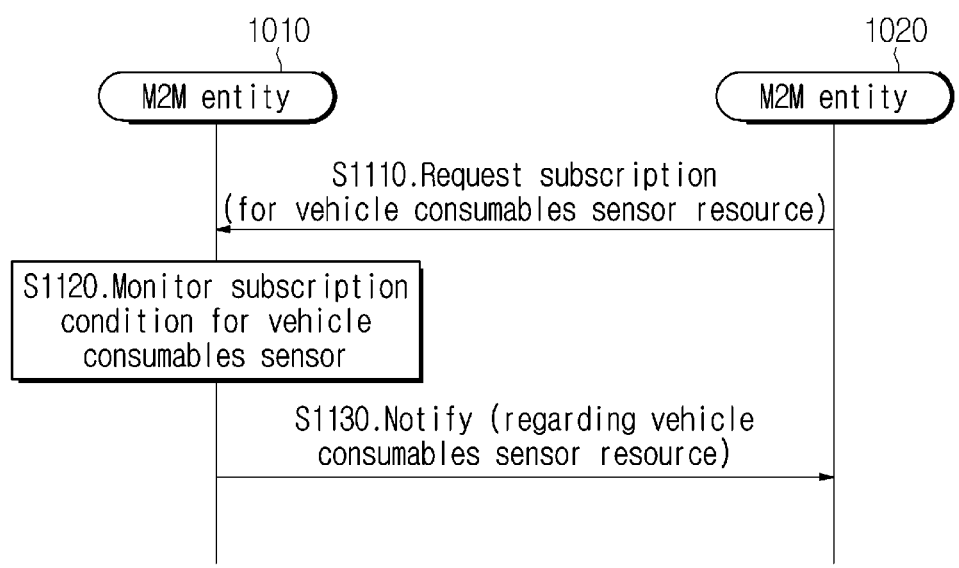
FIG. 11 is a view illustrating a subscription and notification operation.

Meanwhile, as an example, as described above regarding subscription and notification, it is necessary to control the amount of transmitted notification messages. More specifically, as described above, by making a notification message transmitted only under a predetermined condition, it is possible to prevent notification messages from being indiscriminately transmitted. Herein, as an example, based on what is described above, information on the number of times an event is matched may be required to prevent indiscriminate transmission. As an example, referring to FIG. 10, there may be an automotive consumables sensor and a gateway coupled to the sensor in a vehicle. Herein, based on subscription and notification operations, the status of an automotive consumable is monitored, and notification may be performed based on a sensing value for the automotive consumable. As an example, the automotive consumable may be an extra battery, a tire, and engine oil. Also, the same may be applied to other consumables, but the present disclosure is not limited to the above-described embodiment. Herein, as an example, subscription and notification may be set based on an event in which a value sensed by the automotive consumables sensor and a preset value are compared with each other. Herein, the automotive consumables sensor may transmit information on a sensed value to the gateway. Herein, after reading the sensed value, the gateway may transmit a notification to an application, when the sensed value does not satisfy the preset value. Herein, as an example, the automotive consumables sensor, the gateway, and the application may all exist in a vehicle. Thus, subscription and notification may occur in the vehicle based on an event. As another example, referring to FIG. 11, an application may be included in another device via a network and is not limited to the above-described embodiment. That is, based on subscription and notification, a notification may be transmitted to a subscriber.

As for a more specific operation, a gateway 1010 as an M2M entity may receive a subscription request from an application 1020 as an M2M entity. Herein, as an example, as described above, the subscription may be a subscription for a resource associated with an automotive consumables sensor (S1110). Next, the gateway 1010 may monitor a subscription condition for the automotive consumables sensor. That is, the gateway 1010 may receive a sensed value from the automotive consumables sensor periodically or at a specific time. Herein, an event may be a case in which the sensed value does not meet a preset value. As an example, when tire wear is measured as a value and the value is smaller than a preset value, tire wear may be determined as serious so that an event may be triggered. Herein, based on the sensed value, the gateway 1010 may transmit a notification about a resource associated with the automotive consumables sensor to the application 1020. Thus, a user of the application 1020 may confirm the replacement of an automotive consumable.

Herein, as an example, regarding the above-described case, an incorrect notification based on an error of sensed value may occur. As an example, in the case of a vehicle, driving under extreme conditions or being exposed to such extreme conditions may be considered. Herein, a temporary error may occur to a specific sensor in the above-described environment. That is, even before a replacement period ends, an event may be triggered based on an error of sensed value in a specific situation.

As an example, in the case of a sensor for monitoring engine oil status, an extremely high temperature state or an extremely low temperature state may affect a monitoring value of engine oil status. Herein, based on a subscription condition, even in a normal status, a sensed value may be detected under an extreme condition as if in an abnormal status. Herein, the gateway may detect event triggering based on the above-described value and generate a notification based on a subscription. That is, when a notification occurs based on a temporary error, an incorrect notification may be generated. That is, contrary to the intention of a subscription originator, a notification may be made when a subscription condition is temporarily satisfied. Accordingly, a measure may be needed to minimize the unnecessary notification as described above. However, the above-described subscription-related attribute or eventNotification-Criteria attribute may have a limitation in preventing an unnecessary notification in the above-described case.

Based on what is described above, an attribute for the number of times an event is matched may be defined. As an example, the number of times an event is matched may be defined as attribute information for subscription as in Table 4 or Table 5 below. That is, the number of times an event is matched as one piece of attribute information for subscription may be set in parallel with eventNotificationCritiera attribute. Also, as an example, the number of times an event is matched may be any one of eventNotificationCriteria attributes. That is, the number of times an event is matched may be set as one of tag values of eventNotificationCritera, as in Table 6 or Table 7.

Herein, as an example, the above-described number of times an event is matched may minimize the occurrence of a notification caused by a temporary error. That is, the number of times an event is matched may be set as a requirement of notification occurrence to prevent determination based on a temporary error. Herein, considering the above-described case, it is possible to consider a case in which a sensed value for an automotive consumables sensor does not meet a present value. However, as described above, since it may be a temporary error, additional sensing may be needed. Herein, as an example, the additional sensing may be performed based on a predetermined time interval. Also, as an example, the additional sensing may be continuously performed and is not limited to the above-described embodiment. Herein, a gateway may count a case, in which the sensed value does not meet the preset value, based on the above-described number of times an event is matched. Herein, when the sensed value does not meet the preset value more than a value set by the number of times an event is matched, the above-described situation may not be a temporary error. Accordingly, the gateway may determine a time for replacing a consumable and transmit the above-described notification.

TABLE 4

| <subscription> 속성 | 설명 |
|---|---|
| 이벤트기준충족횟수 (nrOfmatchingCriteria) | 본 속성은 정해진 타임프레임내에이벤트 조건이 미리 정해진 수로 만족하는경우에만 구독자가 통지를 받고 싶은 경우를 나타낸다. 이 속성은 미리 정해진 수 및 미리 정해진 타임 프레임을 포함한다. |

TABLE 5

| Attributes of <subscription> | Description |
|---|---|
| nrOfmatchingCriteria | This attribute indicates that the subscriber wants to receive a notification only when the event criteria are matched repeatedly up to predefined number within the specified timeframe. This attribute indicates the predefined number of iterations and the designated timeframe. |

TABLE 6

| 조건태그 (Condition tag) | 발생횟수 (Multiplicity) | Matching condition |
|---|---|---|
| 이벤트기준충족횟수 (nrOfmatchingCriteria) | 0 . . . 1 | 본 속성은정해진 타임프레임내에 이벤트 조건이 미리정해진 수로만족하는 경우에만 구독자가 통지를받고 싶은 경우를 나타낸다. 이 속성은 미리 정해진 수 및 미리 정해진 타임 프레임을 포함한다. |

TABLE 7

| Condition tag | Multiplicity | Matching condition |
|---|---|---|
| nrOfmatchingCriteria | 0 . . . 1 | This tag indicates that the subscriber wants to receive a notification only when the event criteria are matched repeatedly up to predefined number within the specified timeframe. This tag indicates the predefined number of iterations and the designated timeframe. |

Also, a subscriber may want to receive a notification only when an event condition is maintained for a specific period. Rather, a subscriber may assume that a specific condition is being maintained. As an example, in consideration of what is described above, a subscription resource may include an attribute for a period of event matching (e.g., periodOfMatchingCriteria) or include a period of event matching (e.g., periodOfMatchingCriteria) as one matching tag of eventNotificationCriteria.

Meanwhile, as an example, regarding the number of times an event is matched, reset information may be additionally set. As an example, nrOfmatchingCriteriaReset information may be defined. More specifically, the number of times an event is matched may be counted as described above. Herein, when the number of times an event is matched is counted, the number of times an event is matched may be successively counted. As an example, when a case in which a sensed value does not meet a preset value is detected, the number of times an event is matched may be reset and counted again. As another example, based on probabilistic information or other information, reset for counting the number of times an event is matched may also be set to a separate value. That is, when the number of times an event is matched is counted, the number of times an event is matched may be successively counted. As an example, when a case in which a sensed value does not meet a preset value is detected as many times as a value set by nrOfmatchingCriteriaReset, the number of times an event is matched may be reset and counted again. That is, when a predetermined case is met, counting for the number of times an event is matched may be reset, which is not limited to the above-described embodiment.

Also, as an example, regarding the cross resource described above, a priority order (or an order) may be set for a plurality of subscription conditions. More specifically, in the above-described case, a host may receive a notification based on a single resource from each sensor and then perform notification to a subscriber based on this. Herein, a cross resource may perform notification to the subscriber when the above-described notifications occur based on a time window. As an example, regarding notification for a cross resource, a priority order (or an order) needs to be set for notifications. More specifically, when there is a plurality of notifications based on a cross resource, a priority for a specific notification may be set. As an example, a plurality of notifications may be generated to a subscriber based on a first subscription condition and a second subscription condition and based on a first notification and a second notification. Herein, as an example, the first notification may have priority over the second notification. That is, when the second notification is detected after the first notification occurs, ultimate notification may be performed to a subscriber as described above. As an example, the above-described time window may start when a first notification occurs. Next, when a second notification is received during a period corresponding to the time window, an ultimate notification may be transmitted based on a cross resource condition. On the other hand, when the second notification occurs before the first notification, the time window may not start. That is, the first notification may have priority over the second notification. As a specific example, it is possible to consider a car speeding prevention notification service. Herein, as an example, a first subscription condition may be the occurrence of notification/alert when a surveillance camera is found. Also, a second subscription condition may be the occurrence of notification/alert when a vehicle runs at a speed over a threshold value. Herein, a notification may occur when a speed over the threshold value is detected after the vehicle has passed the surveillance camera. However, the notification may be an unnecessary notification. However, as described above, a time window may be set, and whether or not to notify may be determined for a period corresponding to a time window size. Accordingly, an unnecessary notification may occur as described above. As an example, a time window may start based on a first subscription condition according to the surveillance of a speed camera. Herein, a vehicle may pass the camera while maintaining a speed below a threshold value. However, a size of the time window may be greater than a period between a time when the first subscription condition is satisfied and a time when the vehicle passes the camera. That is, even when the vehicle has passed the camera, a notification for a cross resource may be valid. Herein, when the vehicle runs at a speed over the threshold value after passing the camera, a host may perform notification to a subscriber based on the cross resource. Accordingly, as described above, as the vehicle has already passed the camera, an unnecessary notification may occur. Considering what is described above, a second subscription condition may be set to have priority over the first subscription condition. That is, even when the first subscription condition is satisfied, the time window may not start. As an example, even when the vehicle detects the camera, the time window may not start. On the other hand, when the vehicle runs at a speed over the threshold value, the time window may start based on the second subscription condition. Herein, when the first subscription condition is satisfied according to the surveillance camera, the host may transmit a notification to the subscriber based on the cross resource.

That is, when there is a plurality of subscription conditions as described above, there may be a priority order (or an order) according to the subscription conditions. Thus, the occurrence of an unnecessary notification may be prevented. Meanwhile, various settings may be possible with respect to a priority order (or an order). As an example, there may be three or more single resources as a plurality of subscription conditions. Herein, as an example, only when each subscription condition is detected based on a preset order, a host may transmit an ultimate notification to a subscriber based on a cross resource.

As another example, regarding a priority order, only a subscription condition for initiating a time window may be set, and the other subscription conditions may have a same priority. As an example, when there are a first subscription condition, a second subscription condition, and a third subscription condition, only the first subscription may be a subscription condition for initiating the time window. That is, the first subscription condition may have priority over the second subscription condition and the third subscription condition. Herein, when the time window starts as the first subscription condition is satisfied, if the second subscription condition and the third subscription condition are satisfied during a time window size, an ultimate notification may be transmitted to a subscriber. That is, a priority order may be set as a specific subscription condition for initiating a time window, and the other subscription conditions may have a same priority. As an example, the above description may also be applied to a case in which a plurality of subscription conditions are applied, and the present disclosure is not limited to the above-described embodiment.

Herein, as an example, based on what is described above, a crossResourceSubscription resource may include an attribute (or function) that may generate a cross subscription notification by considering an order of satisfying a subscription condition for a target resource. As an example, the attribute is a new attribute indicating an order of satisfying a subscription condition for a crossResourceSubscription resource and may be as described in Table 8 or Table 9. As an example, "eventNotificationCriteriaOrder (or priority order)" may be added as new attribute. Herein, based on Table 8 below, the eventNotificationCriteraOrder may be an order for event notification criteria. Herein, when the attribute described below does not exist, the order of event notification criteria may not be considered as before. On the other hand, when the attribute is included, if the attribute does not satisfy an event notification criterion at the first place in an order of event notification criteria, a time window mechanism may not be applied, as described above.

TABLE 8

| <crossResourceSubscription> 속성 | 발생 횟수 (Multiplicity) | RW/RO/WO | 설명 (Description) |
|---|---|---|---|
| 이벤트통지기준발생순서 (eventNotificationCriteriaOrder or eventNotificationCriteriaSequence) | 0...1(L) | RW | 본 속성은 이벤트 통지 기준의 순서를 나타낸다. 본속성이 없거나 그 값이 없는 경우, 이벤트 통지 기준의 순서는 고려하지않을 것이다. 본 속성이 이벤트 통지 기준의 순서를 포함하고 있는 경우, 첫번째 순서의 이벤트 통지 기준을 충족하지않는 경우 시간 구간 (timeWindow) 매커니즘은 적용되지않을 것이다. |

TABLE 9

| Attributes of <crossResourceSubscription> | Multiplicity | RW/RO/WO | Description |
|---|---|---|---|
| eventNotificationCriteriaOrder or eventNotificatonCriteriaSequence | 0...1(L) | RW | This attribute indicates event notification criteria order (or sequence). If this attribute is not present or a value of this attribute is not present, it shall be not applied event notification criteria order (or sequence) If this attribute includes event notification criteria order (or sequence), time window mechanism is not applied when a first order (or sequence) of event notification criteria is not satisfied |

Also, as an example, attribute information may be set as "StartofTimeWindow" by considering that an event notification criterion at the first place is a subscription condition for initiating a time window mechanism. As an example, a StartofTimeWindow value may be set with respect to a resource that is a target of a cross resource. As an example, the above-described StartofTimeWindow value may be set to 1 with respect to a resource for StartofTimeWindow among a plurality of resources included in a cross resource. On the other hand, for the other resources, the above-described StartofTimeWindow value may be set to 0. As an example, when a priority order of subscription conditions is set based on an event notification criteria order, based on the above-described StartofTimeWindow value, it may be indicated for which resource a subscription initiates a time window.

Figure 12:
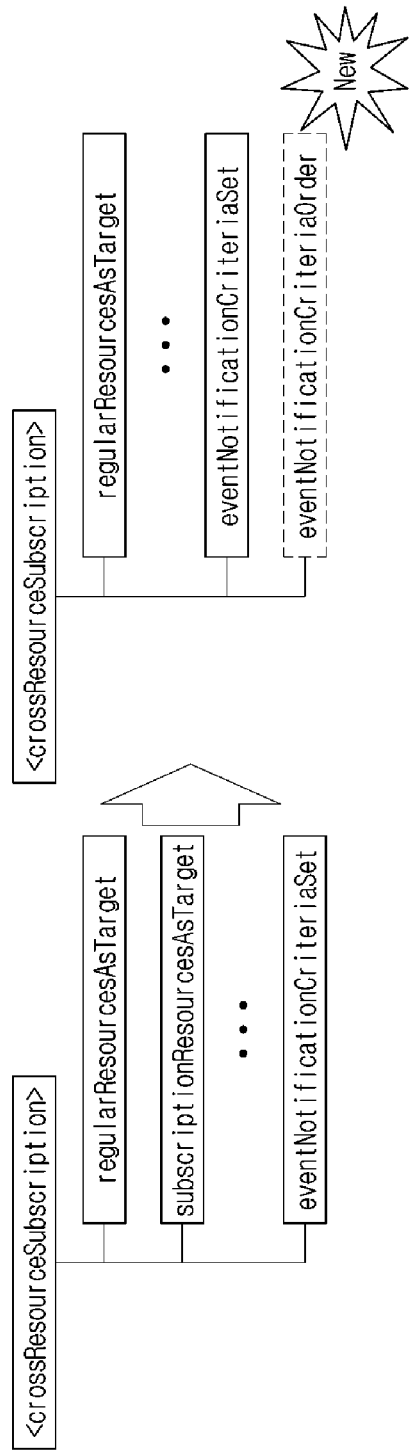
FIG. 12 and FIG. 13 are views illustrating a method for updating an expiration counter for a cross resource.
Figure 13:
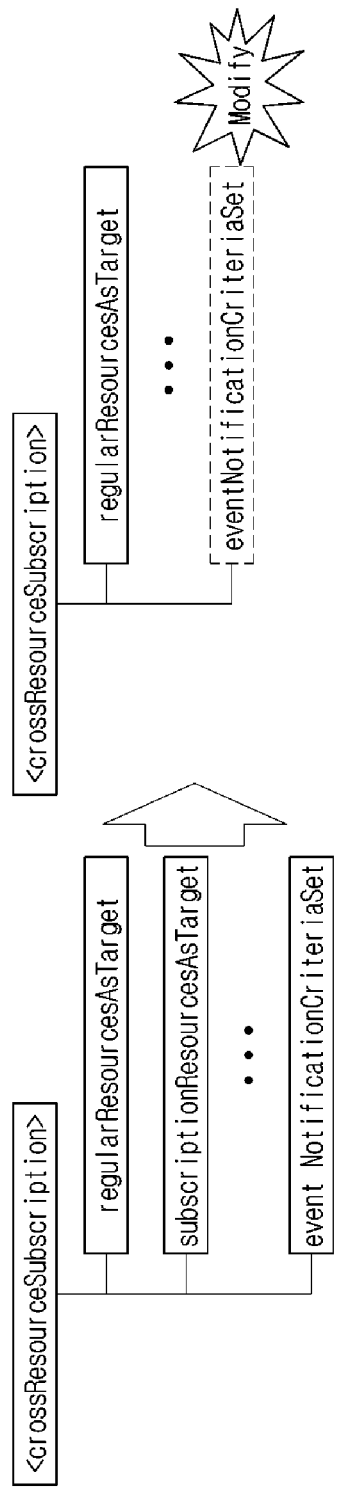

As another example, no new attribute for eventNotificationCriteria may be defined, and as described based on Table 10 or Table 11 below, information on eventNotificationCriteriaOrder may be included in "eventNotificationCriteriaSet". That is, such information as described above may be added to attribute information included in a resource for an existing cross resource subscription, and thus no new attribute may not be defined and information on eventNotificationCriteriaOrder may be reflected, as illustrated in FIG. 12 and FIG. 13.

TABLE 10

| <crossResourceSubscription> 속성 | 발생횟수 | RW/RO/WO | 설명 (Description) |
|---|---|---|---|
| 이벤트통지기준셋 (eventNotificationCriteriaSet) | 0...1(L) | RW | 본속성은교차-리소스구독과관련되고타겟일반리소스 (regularResourcesAsTarget) 속성에나타난것처럼각레귤러타겟리소스를위한이벤트통지기준을리스트한다. 만약이속성에포함된하나외이벤트통지기준에있다면, 타겟일반리소스 (regularResourcesAsTarget) 속성에의해나타낸모든타겟리소스에적용될것이다. 만약타겟구독리소스 (subscriptionResourceAsTarget) 속성만나타난경우, 이벤트통지기준셋 (eventNotificationCriteriaSet) 은필요하지않을것이다. 본속성은이벤트통지기준 (eventNotificationCriteria) 의순서에대한표시를포함할수있다. 이경우, 규정된이벤트통지기준 (eventNotificationCriteria) 은구독자가 다수의이벤트통지기준 (eventNotificationCriteria) 가규정된순서로충족되는경우에통지를받을수있도록규정된이벤트통 (eventNotificationCriteria) |

TABLE 11

| Attributes of <crossResourceSubscription> | Multiplicity | RW/RO/WO | Description |
|---|---|---|---|
| eventNotificationCriteriaSet | 0 ... 1(L) | RW | This attribute lists eventNotificationCriteria for each regular target resource as indicated in regularResourcesAsTarget attribute and involved in a cross-resource subscription. If there is only one eventNotificationCriteria contained in this attribute, it shall be applied to all target resources as indicated by regularResourcesAsTargetattribute. If only subscriptionResourcesAsTarget attribute appears (i.e. no regularResourcesAsTarget attribute), eventNotificationCriteriaSet shall not be needed. This attribute may include an indiation of a sequenceofeventNotificationCriteria. In this case, the specified eventNotificationCriteria should be satisfied in the given sequence so that the subscriber can get a notification only when mutipleeventNotificationCriteria are met in the specified sequence. |

As an example, as illustrated in FIG. 12, "eventNotificationCriteriaOrder or eventNotificationCriteriaSequence" may be added as a new attribute to a resource of cross-resource subscription. As another example, as illustrated in FIG. 13, an order of event notification criteria may be indicated, as described above, by modifying information included in "eventNotificationCriteriaSet", but is not limited to the above-described embodiment.

Also, as an example, as an attribute for the above-described subscription resource, information on "expirationCounter" of Table 2 needs to be set in a cross resource. More specifically, referring to Table 2 described above, a maximum number of notifications may be set based on expirationCounter, and subscription may be deleted when the maximum number of notifications is exceeded. However, in the case of a cross resource, there may be a plurality of subscriptions, and the relationship between deletion of a target subscription and deletion of a cross subscription may be unclear. As an example, it may be necessary to support setting a maximum number of notifications for an independent subscription in a cross resource.

More specifically, in the case of a cross resource, when a target subscription is deleted, it may be impossible to satisfy a condition. Accordingly, when the target subscription is deleted, a mechanism of deleting a cross subscription may be implemented. Herein, as an example, a case may be considered in which the cross subscription is generated at a time when the expiration of the target subscription is imminent. Herein, although the cross subscription is generated, when the target subscription expires, the cross subscription may be deleted by the target subscription. Accordingly, as the cross subscription is deleted immediately after being generated, a meaningless operation may be executed. In consideration of what is described above, "expirationCounter" for the cross subscription needs to be set. Herein, the expirationCounter for the cross subscription may be set as "crosssubexpirationCounter", as in Table 12 below. That is, as described in Table 12, a maximum number of notifications for a cross resource may be set. Herein, when the number of notification failures exceeds the maximum number of notifications for the cross resource, the cross resource may be deleted irrespective of other policies.

TABLE 12

| This attribute (notification policy) indicates that the subscriber wants to set the life of this cross resource subscription to a limit of a maximum number of notifications. When the number of notifications sent reaches the count of this counter the <crossResourcesubscription> resource shall be deleted regardless of any other policy. |
|---|

Also, as an example, as described above, a cross subscription may become meaningless when a target subscription is deleted. As an example, when <crossResourceSubscription> resource is generated, if the number of existing notifications for an existing subscription resource is close to expirationCounter, contrary to the intention of a subscriber, especially not long after the <crossResourceSubscription> resource is generated, the <crossResourceSubscription> resource may be also deleted due to the deletion of the existing subscription resource. Accordingly, when generating a cross subscription, a policy for adjusting "expirationCounter" of a target subscription may be necessary, which may be described as in Table 13 below. However, Table 13 is merely one example, and another method of setting may be also possible. That is, "expirationCounter" of a target subscription may instruct a cross subscription expiration counter to be added to a target counter based on a cross subscription. Also, as an example, when there is no problem in executing a cross subscription without adjustment for a target subscription, an expiration counter of the target subscription may not be updated. As another example, "expirationCounter" of a target subscription may be set based on a manual and is not limited to the above-described embodiment. That is, a target subscription may be updated in consideration of a case in which a cross subscription is set, and is not limited to the above-described embodiment.

TABLE 13

| Value | Operation |
|---|---|
| 0 | NO-An expiration counter of a target subscription is not updated. |
| 1 | Add-An expiration counter of a cross subscription is added to a target counter. |
| 2 | Manual |
| 3 | Reserved |

Also, as an example, based on what is described above, a resource of a cross-resource subscription may define an update policy for "expirationCounter", which may be described as in Table 14 below. As a specific example, it is possible to consider a case in which a cross-subscription resource is generated when the expirationCounter of a first existing subscription resource is 10 and currentNotification-Counter is 8. Herein, when the crosssubexpirationCounter of the cross-subscription resource is 5, the expirationCounter of the first existing subscription resource may be updated to be 15. Thus, the cross-subscription resource may be prevented from being deleted or operating meaninglessly according to the deletion of the first existing subscription resource. That is, there may be an expirationCounter update policy for increasing the expirationCounter of an existing subscription up to the crosssubexpirationCounter of a cross subscription, when a cross-subscription resource is generated, and the attribute may be defined as in Table 14 or Table 15.

a subscriber generating a cross subscription may not want to receive an independent notification according to an existing subscription at this point. Accordingly, the existing subscription may be set to operate together in subordination to the cross subscription, when the cross subscription is deleted. That is, as it may be preferable that the existing subscription becomes subordinate when the cross subscription is generated, the existing subscription may operate based on what is described above. However, as an example, an operation based on another method may also be possible, and the present disclosure is not limited to the above-described embodiment.

As another example, a policy for expirationCounterUpdate may be set differently. More specifically, when a cross resource is generated, the number of notifications left until the expirationCounter of an existing subscription and the crosssubexpirationCounter of a cross subscription may be compared. Herein, when the number of notifications left until the expirationCounter of the existing subscription is smaller than the crosssubexpirationCounter of the cross subscription, an update may be performed to increase the expirationCounter of the existing subscription by adding the crosssubexpirationCounter of the cross subscription to the expirationCounter of the existing subscription. That is, when an update is unnecessary based on the comparison between the number of notifications left until the expirationCounter of the existing subscription and the crosssubexpiration-Counter of the cross subscription, the expirationCounter

TABLE 14

| <crossResourceSubscription> 속성 | 발생횟수 (Multiplicity) | RW/RO/WO | 설명(Description) |
|---|---|---|---|
| 만료카운터업데이트 (expirationCounterUpdate) | 0 . . . 1 | RW | 이속성(통지정책)은구독자가교차구독리소스의생성시, 기존구독의만료카운터 (expirationCounter) 를업데이트하고 자하는경우를나타낸다.만료카운터업데이트 (expirationCounterUpdate) 가 Yes 인경우, 기존구독의만료카운터 (expiratinCounter) 에교차구독리소스의교차구독만료카운터 (crosssubexpiratinCounter) 가더해지게된다. |

TABLE 15

| attribute of<crossResourceSubscription> | Multiplicity | RW/RO/WO | Description |
|---|---|---|---|
| expirationCounterUpdate | 0..1 | RW | This attribute(or notification policy) indicates whether an existing subscription is updated when the subscriber creates crossResourceSubscription. If a value of the expirationCounterUpdate is "yes", an expiration counter of the existing subscription is added to the crosssubexpiratinCounter of the crossReosourceSubscription. |

As another example, when generating a cross-subscription resource, the problem of deleting the cross-subscription resource immediately after generating the cross-subscription resource by resetting the currentNotificationCounter of an existing subscription.

As another example, together with resetting currentNotificationCounter, the expirationCounter of an existing subscription may be modified to the crosssubexpirationCounter of a cross subscription. That is, when a subscriber generating a cross subscription sets an existing subscription, which is set earlier than the generation of the cross subscription, to be deleted in subordination to the cross subscription, the above-described operation may be performed. Also, as an example, may not be updated, but the present disclosure is not limited to the above-described embodiment.

Meanwhile, as another example, the operation of Table 16 below may be set to be executed by considering a relationship between an existing subscription resource and a cross-subscription resource. More specifically, when the cross-subscription resource is generated, the expirationCounter of the existing subscription resource may be set to be reset. Herein, as the above-described operation may not require an additional command, the operation may be simple.

As another example, when a cross-subscription resource is generated, the expirationCounter of an existing subscription resource may be rewritten as the expirationCounter of the cross-subscription resource. That is, the expirationCounter of an existing subscription resource may be replaced by the expirationCounter of a cross-subscription resource. Thus, the cross-subscription resource may be prevented from being deleted because of the deletion of the existing subscription resource, or a meaningless operation may be prevented. As another example, it is possible to consider a method of resetting a currentNotificationCounter of an existing subscription resource. That is, when a cross resource is generated, as it may be an operation for a new resource, the number of existing notifications may be reset for a new operation.

TABLE 16

When a cross-subscription resource is generated, the expirationCounter of an existing subscription resource is reset.
When a cross-subscription resource is generated, the expirationCounter of an existing subscription resource is rewritten as the expirationCounter of the existing subscription resource.
The number of current notifications is reset.

As a specific example, it is possible to consider a case in which the expirationCounter of a first subscription is a first value, the expirationCounter of a second subscription is a second value, and the expirationCounter of a cross subscription is a third value. Herein, each of the following cases may be considered.

In the case of the third value<the first value<the second value

In the above-described case, the third value, which is the expirationCounter value of a cross subscription, may be smaller than the expirationCounter of an existing subscription. Accordingly, even when the cross subscription is generated, it may not be necessary to adjust the expirationCounter of the existing subscription. However, when a number of current notifications of existing subscriptions is smaller than the expirationCounter of a cross subscription, it may be necessary to reset a currentNotificationCounter of a corresponding subscription. That is, an operation may be executed by comparing the expirationCounter of a cross subscription and the expirationCounter of an existing subscription and by comparing the expirationCounter of the cross subscription and a currentNotificationCounter of the existing subscription.

In the case of the first value<the second value<the third value

In the above-described case, the expirationCounter of a cross subscription may be greater than the expirationCounter of an existing subscription. Accordingly, existing subscriptions may be deleted based on expirationCounter, and the cross subscription may also be deleted. In consideration of what is described above, it may be necessary to readjust the expirationCounters for the first subscription and the second subscription. As an example, when generating a cross-subscription resource by considering the above-described case, an expiration counter readjustment attribute may be included. Herein, as an example, the expiration counter readjustment attribute may be an attribute that instructs the expirationCounter of an existing subscription to be modified. More specifically, the attribute may instruct the expirationCounter of an existing subscription to be rewritten as the expirationCounter of a cross subscription. That is, based on what is described above, an operation may be prevented in which a cross subscription is deleted by an existing subscription or the cross subscription becomes meaningless.

Also, as an example, apart from an operation of readjusting the expirationCounters of the first subscription and the second subscription, it may be necessary to confirm the number of current notifications for the first subscription and the second subscription. Herein, when the number of notifications left is smaller than the expirationCounter of the cross subscription, currentNotificationCounter may be reset.

In the case of the first value<the third value<the second value

In the above-described case, the expirationCounter of a cross subscription may be greater than the expirationCounter of a specific existing subscription and be smaller than the expirationCounter of another existing subscription. Accordingly, when the first subscription as the specific existing subscription is deleted, the cross subscription may also be deleted. Accordingly, in order to prevent the cross subscription from being deleted, the above-described expiration counter readjustment attribute may be included when a cross-subscription resource is generated. Herein, based on the expiration counter readjustment attribute, the expirationCounter of the first subscription may be rewritten as the expirationCounter of the cross subscription. Also, as an example, apart from an operation of readjusting the expirationCounters of the first subscription and the second subscription, it may be necessary to confirm the number of current notifications for the first subscription and the second subscription. Herein, when the number of notifications left is smaller than the expirationCounter of the cross subscription, currentNotificationCounter may be reset.

Based on what is described above, in some cases, the expirationCounter and an existing subscription and a currentNotificationCounter may be adjusted by considering the expirationCounter of a cross subscription. Herein, as an example, as described above, different operations may be set by considering each case.

As another example, when a cross subscription is generated for convenience of operation, an operation may be set irrespective of the expirationCounter value of an existing subscription. As an example, when a cross subscription is generated, based on the above-described expiration counter readjustment attribute, the expirationCounter of an existing subscription may be rewritten as the expirationCounter of the cross subscription. That is, as the existing subscription may be considered to be subordinate to a cross resource when the cross resource is generated, the existing subscription may be rewritten as the expirationCounter of the cross subscription irrespective of the existing expirationCounter. Also, as an example, when a cross subscription is generated, a new resource may be considered to be generated. Accordingly, a currentNotificationCounter of an existing subscription needs to be newly counted. Accordingly, when a cross resource is generated, a currentNotificationCounter of an existing may be reset without being compared with the expirationCounter value of a cross subscription.

That is, when a cross subscription is generated, the expirationCounter value of an existing subscription may be rewritten as the expirationCounter of the cross subscription, and a currentNotificationCounter of the existing subscription may be rewritten, but the present disclosure is not limited to the above-described embodiment.

Figure 14:
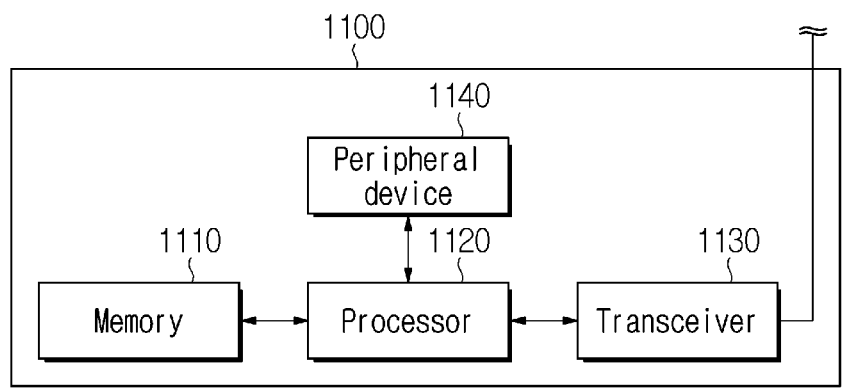
FIG. 14 is a view illustrating a device configuration.

FIG. 14 is a view illustrating an apparatus configuration of the present disclosure.

Referring to FIG. 14, a device 1100 may include a memory 1110, a processor 1120, a transceiver 1130, and a peripheral device 1140. In addition, as an example, the device 1100 may further include another configuration and is not limited to the above-described embodiment. Herein, as an example, the device may be an apparatus operating based on the above-described M2M system. More specifically, the device 1100 of FIG. 14 may be an illustrative hardware/software architecture of an M2M network node such as an M2M device, an M2M gateway, and an M2M server. Herein, as an example, the memory 1110 may be a non-removable memory or a removable memory. In addition, as an example, the peripheral device 1140 may include a display, GPS or other peripherals and is not limited to the above-described embodiment. In addition, as an example, the above-described device 1100 may be a node. Herein, like the transceiver 1130, the node may include a communication circuit. Based on this, the node may perform communication with an external device.

In addition, as an example, the processor 1120 may be at least one of a general-purpose processor, a digital signal processor (DSP), a DSP core controller, a micro controller, application specific integrated circuits (ASICs), field programmable gate array (FPGA) circuits, any other type of integrated circuit (IC), and one or more microprocessors related to a state machine. In other words, it may be a hardware/software configuration playing a controlling role for controlling the above-described device 1100. Here, the processor 1120 may execute computer-executable commands stored in the memory 1110 in order to implement various necessary functions of node. As an example, the processor 1120 may control at least any one operation among signal coding, data processing, power controlling, input and output processing, and communication operation. In addition, the processor 1120 may control a physical layer, an MAC layer and an application layer. In addition, as an example, the processor 1120 may execute an authentication and security procedure in an access layer and/or an application layer but is not limited to the above-described embodiment.

In addition, as an example, the processor 1120 may perform communication with other devices via the transceiver 1130. As an example, the processor 1120 may execute computer-executable commands so that a node may be controlled to perform communication with other nodes via a network. That is, communication performed in the present disclosure may be controlled. As an example, other nodes may be an M2M gateway, an M2M server and other devices. For example, the transceiver 1130 may send a RF signal through an antenna and may send a signal based on various communication networks. In addition, as an example, MIMO technology and beam forming technology may be applied as antenna technology but are not limited to the above-described embodiment. In addition, a signal transmitted and received through a transceiver 1130 may be controlled by a processor 1120 by being modulated and demodulated, which is not limited to the above-described embodiment.

Figure 15:
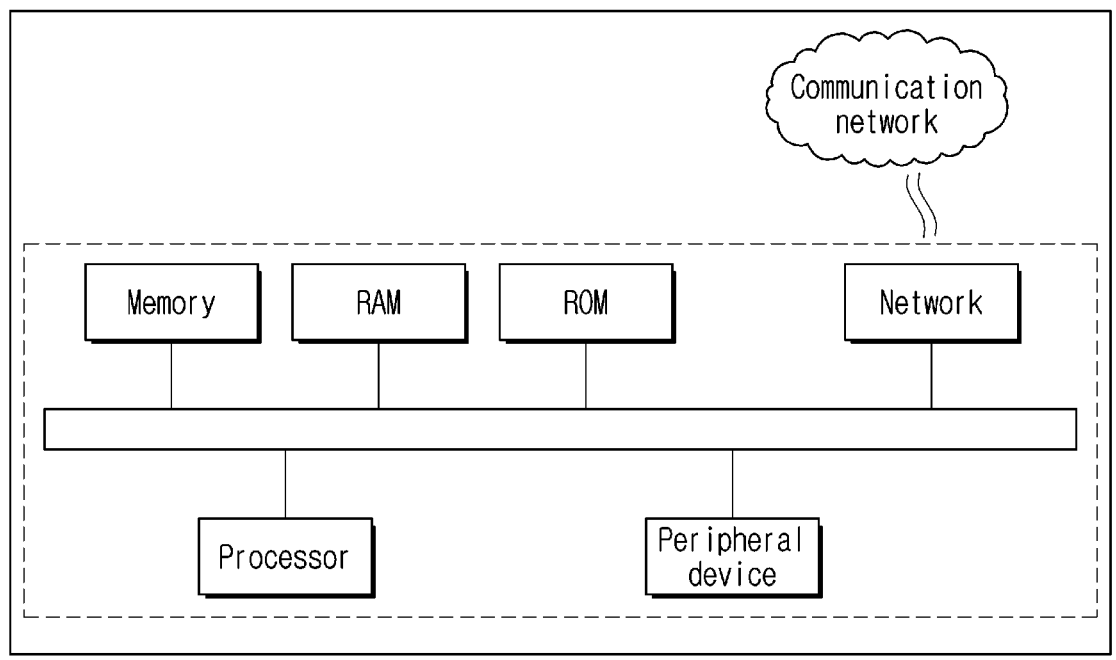
FIG. 15 is a view illustrating a device configuration.

FIG. 15 may be an apparatus configuration for a device. Referring to FIG. 15, as described above, it may be controlled by a processor. Herein, as an example, a memory, RAM, ROM and a network may be included. In addition, another movable memory may be further included and is not limited to the above-described embodiment. Herein, the processor may be controlled to execute a command based on information stored in the above-described memories and to perform the operations described in the present disclosure. In addition, the processor may be provided with power by a power supply and be offered input information by peripherals, which is not limited to the above-described embodiment. In addition, as an example, a device may obtain location information and related information based on GPS and the like. In addition, as an example, a device may receive input information based on other input devices and is not limited to the above-described embodiment.

The above-described exemplary embodiments of the present disclosure may be implemented by various means. For example, the embodiments of the present disclosure may be implemented by hardware, firmware, software, or a combination thereof.

The foregoing description of the preferred embodiments of the present disclosure has been presented for those skilled in the art to implement and perform the disclosure. While the foregoing description has been presented with reference to the preferred embodiments of the present disclosure, it will be apparent to those skilled in the art that various modifications and variations can be made in the present disclosure without departing from the spirit or scope of the present disclosure as defined by the following claims. Accordingly, the present disclosure is not intended to be limited to the embodiments shown herein but is to be accorded the widest scope consistent with the principles and novel features disclosed herein. In addition, while the preferred embodiments of the present specification have been particularly shown and described, it is to be understood that the present specification is not limited to the above-described embodiments, but, on the contrary, it will be understood by those skilled in the art that various changes and modifications can be made without departing from the spirit and scope of the present specification as defined by the claims below, and such changes and modifications should not be individually understood from the technical thought and outlook of the present specification.

In this specification, both the disclosure and the method disclosure are explained, and the description of both disclosures may be supplemented as necessary.

In addition, the present disclosure has been described with reference to preferred embodiments thereof. It will be understood by those skilled in the art that various changes in form and details may be made therein without departing from the essential characteristics of the present disclosure. Therefore, the disclosed embodiments should be considered in an illustrative sense rather than in a restrictive sense. The scope of the present disclosure is defined by the appended claims rather than by the foregoing description, and all differences within the scope of equivalents thereof should be construed as being included in the present disclosure.

INDUSTRIAL APPLICABILITY

The present disclosure may be applied not only to a oneM2M system but also to various systems.

What is claimed is:

1. A method for transmitting, by a host, a notification to a subscriber based on a cross resource subscription, the method comprising:
setting a plurality of subscription conditions and a priority order for the cross resource subscription, wherein the priority order indicates a sequence of the plurality of subscription conditions;
detecting each event that satisfies each of the plurality of subscription conditions; and
when all of the plurality of subscription conditions are satisfied according to the sequence, transmitting a notification for the cross resource subscription to the subscriber.

2. The method of claim 1, wherein the notification for the cross resource subscription is transmitted to the subscriber only when each event, which satisfies each of the plurality of subscription conditions, is detected in a time window.

3. The method of claim 2, wherein the time window starts, when an event for any one subscription condition among the plurality of subscription conditions is detected.

4. The method of claim 3, wherein when the priority order is set for the plurality of subscription conditions, the time window starts only when an event for a subscription condition with highest priority among the plurality of subscription conditions is detected.

5. The method of claim 4, wherein when the time window starts as the event for the subscription condition with highest priority is detected, if the plurality of subscription conditions are satisfied within a time interval corresponding to the time window, the notification for the cross resource subscription is transmitted to the subscriber.

6. The method of claim 1, wherein the host requests a single resource for each of the plurality of subscription conditions to each M2M entity, and
wherein each M2M entity transmits each notification to the host based on the single resource, when an event is triggered based on each subscription condition.

7. The method of claim 6, wherein when the host receives each notification from each M2M entity within a time window, the host transmits the notification for the cross resource subscription to the subscriber.

8. The method of claim 1, wherein when the plurality of subscription conditions are set based on the cross resource subscription, an expiration counter for the cross resource subscription is set.

9. The method of claim 8, wherein when there is an existing subscription associated with any one or more among the plurality of subscription conditions before the plurality of subscription conditions are set, an expiration counter for the existing subscription is updated based on the expiration counter for the cross resource subscription.

10. The method of claim 9, wherein the expiration counter for the existing subscription is rewritten as the expiration counter for the cross resource subscription.

11. The method of claim 10, wherein the expiration counter for the existing subscription is rewritten as the expiration counter for the cross resource subscription, only when the expiration counter for the existing subscription is smaller than the expiration counter for the cross resource subscription.

12. The method of claim 9, wherein when the expiration counter for the existing subscription is updated based on the expiration counter for the cross resource subscription, a current notification counter for the existing subscription is reset.

13. The method of claim 12, wherein the current notification counter for the existing subscription is reset, only when a number of notifications, which are left based on the current notification counter for the existing subscription, is smaller than the expiration counter of the cross resource subscription.

14. A host configured to transmit a notification to a subscriber based on a cross resource subscription, the host comprising:
a transceiver configured to transmit and receive a signal; and
a processor configured to control the transceiver,
wherein the processor is further configured to:
set a plurality of subscription conditions and a priority order for the cross resource subscription, wherein the priority order indicates a sequence of the plurality of subscription conditions,
detect each event that satisfies each of the plurality of subscription conditions, and
transmit a notification for the cross resource subscription to the subscriber when the plurality of subscription conditions are all satisfied according to the sequence.

15. The host of claim 14, wherein the notification for the cross resource subscription is transmitted to the subscriber, only when each event, which satisfies each of the plurality of subscription conditions, is detected in a time window.

16. The host of claim 15, wherein the time window starts, when an event for any one subscription condition among the plurality of subscription conditions is detected.

17. The host of claim 16, wherein when the priority order is set for the plurality of subscription conditions, the time window starts only when an event for a subscription condition with highest priority among the plurality of subscription conditions is detected.

18. The host of claim 17, wherein when the time window starts as the event for the subscription condition with highest priority is detected, if the plurality of subscription conditions are satisfied within a time interval corresponding to the time window, the notification for the cross resource subscription is transmitted to the subscriber.

19. A method for receiving, by a subscriber, a notification from a host based on a cross resource subscription, the method comprising:
transmitting, to the host, a request for the cross resource subscription based on a plurality of cross resource conditions;
receiving, from the host, a notification for the cross resource subscription, when all of a plurality of subscription conditions are satisfied according to a sequence for the cross resource subscription; and
performing an operation based on the received notification,
wherein the plurality of subscription conditions have a priority order that indicates the sequence of the plurality of subscription conditions.

* * * * *